(12) United States Patent
Miura et al.

(10) Patent No.: US 7,162,090 B2
(45) Date of Patent: Jan. 9, 2007

(54) IMAGE PROCESSING APPARATUS, IMAGE PROCESSING PROGRAM AND IMAGE PROCESSING METHOD

(75) Inventors: Hirotsuna Miura, Suwa (JP); Masaki Ishikawa, Kunitachi (JP)

(73) Assignee: Seiko Epson Corporation, Tokyo (JP)

( * ) Notice: Subject to any disclaimer, the term of this patent is extended or adjusted under 35 U.S.C. 154(b) by 772 days.

(21) Appl. No.: 10/372,215

(22) Filed: Feb. 25, 2003

(65) Prior Publication Data
US 2004/0005006 A1 Jan. 8, 2004

(30) Foreign Application Priority Data

Mar. 7, 2002 (JP) .............................. 2002-061940
Feb. 3, 2003 (JP) .............................. 2003-026155

(51) Int. Cl.
*G06K 9/36* (2006.01)

(52) U.S. Cl. ...................................... 382/233

(58) Field of Classification Search ........ 382/232–236, 382/238–252; 375/240.24–240.27; 348/398.1–416.1
See application file for complete search history.

(56) References Cited

U.S. PATENT DOCUMENTS

| 5,796,875 | A | 8/1998 | Read |
| 6,320,905 | B1 | 11/2001 | Konstantinides |
| 6,430,317 | B1 * | 8/2002 | Krishnamurthy et al. ... 382/236 |

FOREIGN PATENT DOCUMENTS

| JP | A 03 046482 | 2/1991 |
| JP | A-5-227518 | 9/1993 |
| JP | A 11 098505 | 4/1999 |
| JP | B2-2919986 | 4/1999 |
| JP | A-11-187400 | 7/1999 |

OTHER PUBLICATIONS

Lee et al., "Loop filtering and post-filtering for low-bit-rates moving picture coding," Signal Processing: Image Communication 16, pp. 871-890, 2001.

* cited by examiner

*Primary Examiner*—Jose L. Couso
(74) *Attorney, Agent, or Firm*—Oliff & Berridge, PLC

(57) ABSTRACT

To provide an image processing apparatus suitable for simplifying and accelerating a filtering process at the time of decoding an image and implementing an effective filter effect. A deblock filtering process judges whether or not difference values between values of subject pixels $v_0$ to $v_7$ and values of reference pixels $r_{y0}$ to $r_{y7}$ are exceeding a threshold, performs horizontal filter operation as to the subject pixels $v_0$ to $v_7$ based solely on the values of the subject pixels $v_0$ to $v_7$ and the values of the reference pixels $r_{x0}$ and $r_{x1}$, determines whether or not to perform vertical filter operation as to the subject pixels $v_0$ to $v_7$ based solely on the judgment result, and performs the vertical filter operation as to the subject pixels $v_0$ to $v_7$ based solely on the values of the subject pixels $v_0$ to $v_7$ and the values of the reference pixels $r_{y0}$ to $r_{y7}$.

10 Claims, 14 Drawing Sheets

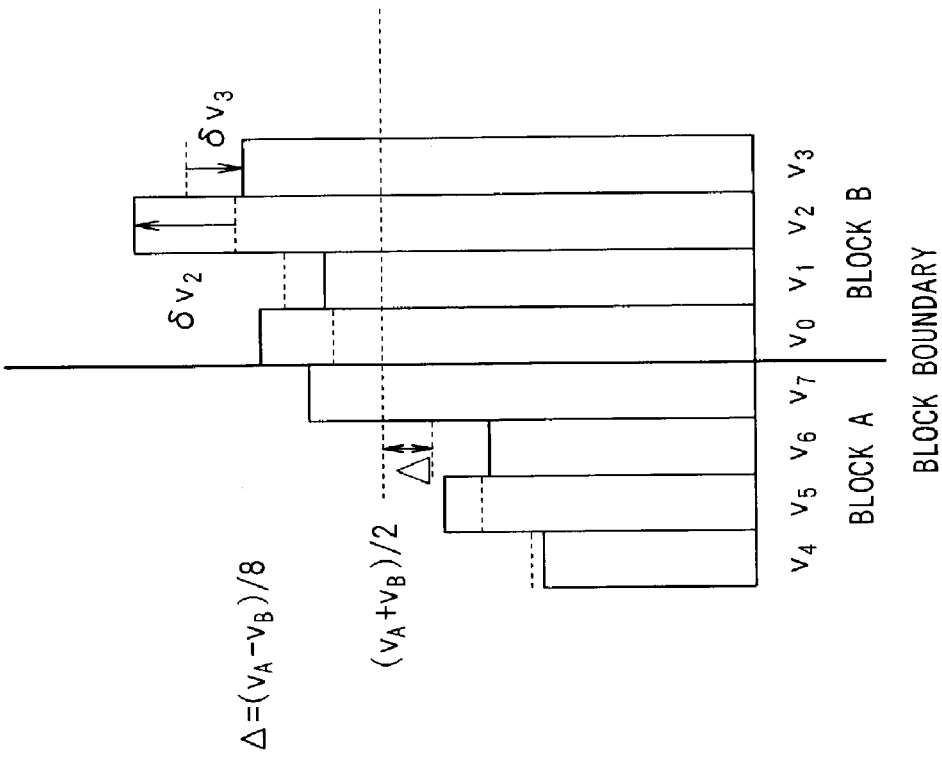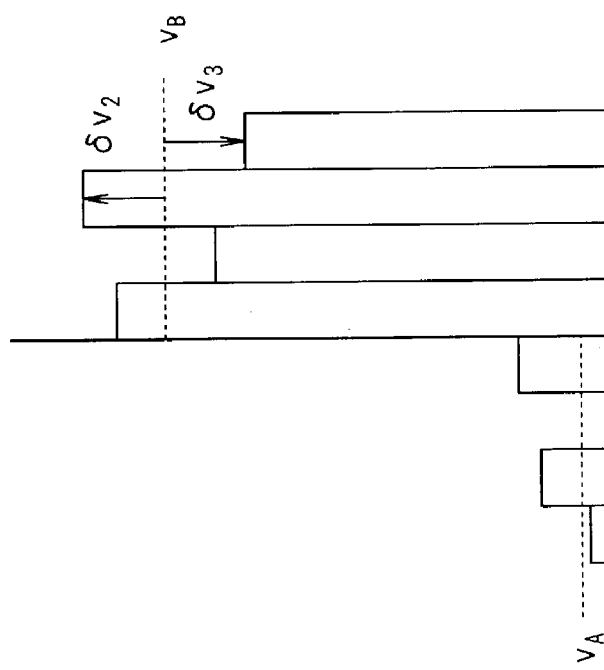

IMAGE PROCESSING APPARATUS, IMAGE PROCESSING PROGRAM AND IMAGE PROCESSING METHOD

BACKGROUND OF THE INVENTION

1. Field of the Invention

The present invention relates to an apparatus, a program and a method for, at the time of expanding an image by a block based on compressed image data compressed by JPEG (Joint Photographic Experts Group), MPEG (Moving Picture Experts Group) or the like, performing a filtering process to the expanded image, and in particular, to an image processing apparatus, an image processing program and an image processing method suitable for simplifying and accelerating the filtering process at the time of decoding the image and implementing an effective filter effect.

2. Description of the Related Art

The JPEG method as a compression technology for a still picture and the MPEG method as a compression technology for a motion picture are widely known. These image compression methods handle a block of 8 pixels×8 pixels as a unit of processing to perform a DCT (Discrete Cosine Transform) process. The DCT process is a process of decomposing an original image into spatial frequency components, and it can compress the image by reducing spatially redundant information.

Incidentally, in case of adopting the JPEG method or the MPEG method, the following two types of noise are generated, which becomes a cause of deteriorating image quality. To be more specific, as the JPEG method and the MPEG method handle the block of 8 pixels×8 pixels as a unit of processing, a boundary of the block may appear as the noise depending on the image. This occurs because the DCT process is the process of eliminating an equivalent to a direct current component of the spatial frequency components of the image, and this process is performed block by block so that an average of luminance of each block becomes different. This noise on the boundary portion is called block noise.

In addition, in the case of the DCT process by the JPEG method and the MPEG method, a higher harmonic component of the spatial frequency components of the image is eliminated as the redundant information so that there appears the noise in a portion of significant difference in luminance from the surroundings. For instance, if the DCT process is performed in the case where there are significant variations in luminance in the block such as a character existing in the backdrop of a natural image, the higher harmonic component is eliminated from data constituting the original boundary portion and blurry noise appears around the boundary. This noise is called mosquito noise.

A technology for reducing the block noise and the mosquito noise is described in Japanese Patent Laid-Open No. 3-46482. As for the technology described therein (hereafter, referred to as a first past example), a filtering process is performed in the case where a signal level difference between boundary pixels located sandwiching the boundary between mutually adjacent blocks is larger than a first threshold, and of the boundary pixel and the pixels on a string in each of the blocks, the signal level differences from the pixels adjacent to that boundary pixel in the same block are smaller than a second threshold respectively.

At this time, in FIG. 14, the signal levels for pixel placements X0 and X'0 are corrected based on difference values d0, d1 and d2 of the signal levels $S_1$, $S_0$, $S'_0$ and $S'_1$ for the pixel placements X1 and X0 and the pixel placements X'0 and X'1 located on both sides of the block boundary. To be more specific, the new signal levels $S_{0-new}$ and $S'_{0-new}$ are as follows.

$$S_{0-new} = (S_1 + 2 \cdot S_0 + S'_0)/4$$

$$S'_{0-new} = (S_0 + 2 \cdot S'_0 + S'_1)/4$$

In addition, as another method of reducing the block noise and the mosquito noise, a VM (Verification Model) for MPEG 4 and the technology described in Japanese Patent Laid-Open No. 11-98505 (hereafter, referred to as a second past example) are also known. In the second past example, it is determined whether the vertical and horizontal block boundaries shown in FIG. 15 are in a default mode or a DC offset mode and processed respectively.

In this case, pixel sets S0, S1 and S2 are defined with block boundaries B1 and B2 as base points, and a deblocking mode is selectively determined as the default mode or the DC offset mode from a mode determination value based on an extent of a block distortion phenomenon. And if it is determined as the default mode, frequency information on the block boundary surroundings for each pixel is obtained by using a 4-point DCT kernel. If it is determined as the DC offset mode in a mode determination stage, it is determined whether or not execution of the DC offset mode is necessary, and if necessary, the block distortion phenomenon is eliminated.

As for the first past example, however, it only corrects the boundary pixels so that there is a drawback of not being sufficient as the process of eliminating the block distortion. In addition, as for the VM and the second past example, processing is complicated and the computation load is excessive.

In addition, in case of implementing these technologies by hardware, the processing is comparatively complicated, and so there is a problem that it is difficult to render a circuit scale smaller. From the viewpoint of rendering it smaller, it is desirable to simplify the process as much as possible even if the image quality is sacrificed to some extent. In addition, it is desirable, as there is a certain limit to a mountable memory capacity, to render the memory capacity to be occupied for an operation in the filtering process as a possible minimum.

SUMMARY OF THE INVENTION

Thus, the present invention has been achieved by paying attention to these unsolved problems of the past technologies, and a first object thereof is to provide an image processing apparatus, an image processing program and an image processing method suitable for simplifying and accelerating the filtering process when decoding the image and implementing an effective filter effect. In addition, a second object thereof is to provide the image processing apparatus, the image processing program and the image processing method suitable for reducing the memory capacity to be occupied for the operation in the filtering process when decoding the image.

In order to attain the above objects, an image processing apparatus according to claim 1 of the present invention is an apparatus for, based on compressed image data compressed by an image compressing process for performing a discrete cosine transform process and a quantization process by a predetermined block, performing a filtering process to an expanded image on or after expanding the image by the above described block, wherein, in the case where a block adjacent to a subject block is a reference block, and furthermore, one pixel in the above described subject block is a subject pixel, and one pixel in the above described reference block is a reference pixel, the above described filtering process judges whether or not a difference value between a value of the above described subject pixel and a value of the above described reference pixel is exceeding a threshold, determines whether or not to perform filter operation as to the above described subject pixel based solely on the above described judgement result, and performs the filter operation as to the above described subject pixel based solely on the value of the above described subject pixel and the value of the above described reference pixel.

In the case of such a configuration, it is judged by the filtering process whether or not the difference value between the value of the subject pixel and the value of the reference pixel is exceeding the threshold on or after expanding the image by the block based on the compressed image data so that it is determined whether or not to perform the filter operation as to the subject pixel based solely on the judgment result. And if it is determined to perform the filtering process as to the subject pixel, the filter operation is performed based solely on the value of the subject pixel and the value of the reference pixel.

Here, to determine whether or not to perform the filter operation based solely on one judgment result means to determine it based solely on the result of judging whether or not the difference value between the value of the subject pixel and the value of the reference pixel is exceeding the threshold in case of using only one reference pixel for one subject pixel such as the case of only vertically performing the filtering process to the subject pixel. In addition, in case of using a plurality of reference pixels for one subject pixel such as the case of horizontally and vertically performing the filtering process to the subject pixel, the requirement of "only" is interpreted as to the filtering process in each direction. To be more specific, in this case, a vertical filtering process meets the requirement of "only" in a configuration wherein it determines whether or not to perform a vertical filter operation as to the subject pixel based solely on one judgment result but determines whether or not to perform a horizontal filter operation as to the same subject pixel based on a plurality of judgment results. As a matter of course, a horizontal filtering process meets the requirement of "only" in the present invention in the opposite case thereto. Hereafter, it is the same as to the image processing apparatus according to claim 2, the image processing program according to claims 9 and 10 and the image processing method according to claims 11 and 12.

In addition, to perform the filter operation based solely on two pixel values means to perform it based solely on the value of the subject pixel and the value of the reference pixel in case of using only one reference pixel for one subject pixel such as the case of only vertically performing the filtering process to the subject pixel. In addition, in case of using a plurality of reference pixels for one subject pixel such as the case of horizontally and vertically performing the filtering process to the subject pixel, the requirement of "only" is interpreted as to the filtering process in each direction. To be more specific, in this case, the vertical filtering process meets the requirement of "only" in the configuration wherein it performs the vertical filter operation as to the subject pixel based solely on two pixel values but performs the horizontal filter operation as to the same subject pixel based on three or more pixel values. As a matter of course, the horizontal filtering process meets the requirement of "only" in the present invention in the opposite case thereto. Hereafter, it is the same as to the image processing apparatus according to claim 2, the image processing program according to claims 9 and 10 and the image processing method according to claims 11 and 12.

Furthermore, the image processing apparatus according to claim 2 of the present invention is the apparatus for, based on the compressed image data compressed by the image compressing process for performing the discrete cosine transform process and the quantization process by the predetermined block, performing the filtering process to the expanded image on or after expanding the image by the above described block, wherein, in the case where a block horizontally adjacent to the subject block is a horizontal reference block, a block vertically adjacent to the above described subject block is a vertical reference block, and furthermore, one pixel in the above described subject block is a subject pixel, and one pixel in the above described horizontal reference block located on a boundary with the above described subject block and at the same vertical position as the above described subject pixel is a horizontal reference pixel, and one pixel in the above described vertical reference block located on the boundary with the above described subject block and at the same horizontal position as the above described subject pixel is a vertical reference pixel, the above described filtering process judges whether or not a difference value between a value of the above described subject pixel and a value of the above described vertical reference pixel is exceeding a threshold, the above described filtering process performs horizontal filter operation as to the above described subject pixel based solely on the value of the above described subject pixel and the value of the above described horizontal reference pixel, the above described filtering process determines whether or not to perform vertical filter operation as to the above described subject pixel based solely on the above described judgment result, and performs the vertical filter operation as to the above described subject pixel based solely on the value of the above described subject pixel and the value of the above described vertical reference pixel.

In the case of such a configuration, the horizontal filter operation as to the subject pixel is performed by the filtering process based solely on the value of the subject pixel and the value of the horizontal reference pixel on or after expanding the image by the block based on the compressed image data. In addition, it is judged whether or not the difference value between the value of the subject pixel and the value of the vertical reference pixel is exceeding the threshold, and it is determined whether or not to perform the vertical filter operation as to the subject pixel based solely on the judgment result. And if it is determined to perform the vertical filter operation as to the subject pixel, the vertical filter operation is performed based solely on the value of the subject pixel and the value of the vertical reference pixel.

Furthermore, the image processing apparatus according to claim 3 of the present invention is characterized by, in the image processing apparatus according to claim 2, usably connecting to image storing means for storing the above described expanded image, and having storing means for work for storing the pixel data for performing the above described filtering process, and wherein, in the case where a plurality of pixels in the above described subject block and horizontally successive from the boundary with the above described horizontal reference block are the above described subject pixels, the above described filtering process collectively reads the pixel data of a first pixel string comprised of the above described plurality of subject pixels and the above described horizontal reference pixel and the pixel data of a second pixel string comprised of vertical reference pixels corresponding to the above described respective subject pixels into the above described storing means for work, makes the above described judgment as to each of the above described subject pixels based on the pixel data of the above described storing means for work, the above described filtering process performs the horizontal filter operation as to the above described respective subject pixels based solely on the values of the above described subject pixels and the value of the above described horizontal reference pixel by referring to the pixel data of the above described storing means for work, the above described filtering process determines whether or not to perform the vertical filter operation as to the above described respective subject pixels based solely on the above described judgment results corresponding to the subject pixels, and performs the vertical filter operation as to the above described respective subject pixels based solely on the values of the above described subject pixels and the values of the above described vertical reference pixels by referring to the pixel data of the above described storing means for work.

In the case of such a configuration, the pixel data of the first pixel string and the pixel data of the second pixel string are collectively read by the filtering process into the storing means for work, and the horizontal filter operation as to the respective subject pixels is performed by referring to the pixel data of the storing means for work and based solely on the values of the subject pixels and the value of the horizontal reference pixel. In addition, it is judged whether or not the difference value between the value of the above described subject pixel and the value of the above described vertical reference pixel is exceeding the threshold for each subject pixel based on the pixel data of the storing means for work, and it is determined whether or not to perform the vertical filter operation as to each subject pixel based solely on the judgment result corresponding to the subject pixel. And if it is determined to perform the vertical filter operation as to the subject pixel, the vertical filter operation is performed by referring to the pixel data of the storing means for work and based solely on the value of the subject pixel and the value of the vertical reference pixel.

Here, the storing means for work stores the pixel data by any means and in any period, and may have the pixel data stored in advance or may have the pixel data stored by an input from the outside when the apparatus is in operation without having it stored in advance. It is the same in case of storing the expanded image in the image storing means.

Furthermore, the image processing apparatus according to claim 4 of the present invention is characterized by, in the image processing apparatus according to claim 3, constituting each of the above described blocks as a rectangular image area comprised of 2n (n≧1) pieces of pixel horizontally and 2m (m≧1) pieces of pixel vertically, and dividing it into four areas of upper left, upper right, lower left and lower right comprised of n pieces of pixel horizontally and m pieces of pixel vertically, and further constituting the above described first pixel string with the above described horizontal reference pixel and the pixels belonging to the same area of the above described four areas, the above-described filtering process tries the above described filter operation as to all the pixels of the above described expanded image while repeating reading of the above described pixel data, the above described judgment and the above described filter operation as a series of processes, and as to the subject pixel belonging to the upper left area of the above described subject block, the above described filtering process uses the values of the reference pixels of the horizontal reference block and the vertical reference block adjacent to the above described subject block on the left of and above it for the above described judgment and the above described filter operation, as to the subject pixel belonging to the upper right area of the above described subject block, the above described filtering process uses the values of the reference pixels of the horizontal reference block and the vertical reference block adjacent to the above described subject block on the right of and above it for the above described judgment and the above described filter operation, as to the subject pixel belonging to the lower left area of the above described subject block, the above described filtering process uses the values of the reference pixels of the horizontal reference block and the vertical reference block adjacent to the above described subject block on the left of and below it for the above described judgment and the above described filter operation, and as to the subject pixel belonging to the lower right area of the above described subject block, the above described filtering process uses the values of the reference pixels of the horizontal reference block and the vertical reference block adjacent to the above described subject block on the right of and below it for the above described judgment and the above described filter operation.

In the case of such a configuration, the filtering process is performed to all the pixels of the expanded image while the reading of the pixel data, the judgment and the filter operation are repeated as a series of processes by the filtering process.

To be more specific, as for the subject pixels belonging to the upper left area of the subject block, the values of the reference pixels of the horizontal reference block adjacent to the subject block on the left of it and the values of the reference pixels of the vertical reference block adjacent to the subject block above it are used for the judgment and the filter operation.

In addition, as for the subject pixels belonging to the upper right area of the subject block, the values of the reference pixels of the horizontal reference block adjacent to the subject block on the right of it and the values of the reference pixels of the vertical reference block adjacent to the subject block above it are used for the judgment and the filter operation.

In addition, as for the subject pixels belonging to the lower left area of the subject block, the values of the reference pixels of the horizontal reference block adjacent to the subject block on the left of it and the values of the reference pixels of the vertical reference block adjacent to the subject block below it are used for the judgment and the filter operation.

In addition, as for the subject pixels belonging to the lower right area of the subject block, the values of the reference pixels of the horizontal reference block adjacent to the subject block on the right of it and the values of the reference pixels of the vertical reference block adjacent to the subject block below it are used for the judgment and the filter operation.

Here, while n needs to meet the condition of n≧1, n is n≧1 and is also an integer since it does not take a decimal value due to the nature of the invention. In addition, while m needs to take a value which is independent from n and meet the condition of m≧1, m is m≧1 and is also an integer since it does not take a decimal value due to the nature of the invention.

Furthermore, the image processing apparatus according to claim 5 of the present invention is the image processing apparatus according to claim 4, wherein the above described image storing means stores the pixel data of the pixels constituting the above described expanded image in order of left to right and top to bottom, the above described filtering process refers to a pointer for the vertical reference pixel pointing at a storage address of the pixel data of the above described second pixel string in the above described image storing means and reads the pixel data of the above described second pixel string into the above described storing means for work, and furthermore, in the case where the number of horizontal pixels of the above described expanded image is X and a vertical coordinate of the subject pixel in the above described subject block is y, as to each of the above described series of processes, the above described filtering process adds a value equivalent to the number of the subject pixels to be collectively processed in the process to the value of the above described pointer for the vertical reference pixel, when the subject block to be processed next is a leftmost block in the above described expanded image and a remainder on dividing y by 2m is "0", the above described filtering process subtracts 2X from the value of the above described pointer for the vertical reference pixel, when the subject block to be processed next is the leftmost block in the above described expanded image and the remainder on dividing y by 2m is m, the above described filtering process adds 2mX to the value of the above described pointer for the vertical reference pixel, and when the subject block to be processed next is the leftmost block in the above described expanded image and the remainder on dividing y by 2m is a value other than "0" or m, the above described filtering process subtracts X from the value of the above described pointer for the vertical reference pixel.

In the case of such a configuration, in the filtering process, the pointer for the vertical reference pixel is referred to and the pixel data of the second pixel string is read into the storing means for work. The pointer for the vertical reference pixel is updated on the following condition.

First, as to each of the series of processes, the value equivalent to the number of the subject pixels to be collectively processed in the process is added to the value of the pointer for the vertical reference pixel. Therefore, the pointer for the vertical reference pixel moves rightward in each of the series of processes by the number of the subject pixels to be collectively processed in the process. As this move is just adding a predetermined number, it can be implemented just by an adder in case of constituting it by the hardware.

Secondly, if the subject block to be processed next is the leftmost block in the expanded image and the remainder on dividing y by 2m is a value other than "0" or m, X is subtracted from the value of the pointer for the vertical reference pixel. Therefore, when the series of processes are completed as to all the pixels on the same horizontal line in the expanded image, the pointer for the vertical reference pixel moves to the lowest step of the vertical reference block adjacent to the subject block above it. As this move is just subtracting X, it can be implemented just by the adder in case of constituting it by the hardware.

Thirdly, if the subject block to be processed next is the leftmost block in the expanded image and the remainder on dividing y by 2m is m, 2mX is added to the value of the pointer for the vertical reference pixel. Therefore, when the series of processes are completed as to all the pixels on the same horizontal line in the expanded image and the process moves on to the area in the lower half of the subject block, the pointer for the vertical reference pixel moves to the highest step of the vertical reference block adjacent to the subject block below it. As this move is just multiplying X by 2m and adding it, it can be implemented just by a shifter and the adder in case of constituting it by the hardware.

Fourthly, if the subject block to be processed next is the leftmost block in the expanded image and the remainder on dividing y by 2m is "0," 2X is subtracted from the value of the pointer for the vertical reference pixel. Therefore, when the series of processes are completed as to all the pixels on the same horizontal line in the expanded image and the process moves on to the block in the lower step, the pointer for the vertical reference pixel moves to the lowest step of the vertical reference block adjacent to the subject block above it. As this move is just multiplying X by 2 and subtracting it, it can be implemented just by the shifter and the adder in case of constituting it by the hardware.

Furthermore, the image processing apparatus according to claim 6 of the present invention is the image processing apparatus according to claim 5, wherein, in the case where the pixel string comprised of a left half of the pixels on the same horizontal line in the above described subject block is a first subject pixel string, the pixel string comprised of a right half thereof is a second subject pixel string, and furthermore, the pixel string in the above described horizontal reference block and adjacent to the above described first subject pixel string on the left of it and comprised of the same number of pixels as that of the above described second subject pixel string is a first horizontal reference pixel string, and the pixel string in the above described horizontal reference block and adjacent to the above described second subject pixel string on the right of it and comprised of the same number of pixels as that of the above described first subject pixel string is a second horizontal reference pixel string, and furthermore, the pixel string comprised of the vertical reference pixels corresponding to the subject pixels of the above described first subject pixel string is a first vertical reference pixel string, and the pixel string comprised of the vertical reference pixels corresponding to the subject pixels of the above described second subject pixel string is a second vertical reference pixel string, the above described filtering process reads the pixel data of the above described second subject pixel string, the above described second horizontal reference pixel string, the above described first vertical reference pixel string and the above described second vertical reference pixel string into the above described storing means for work as to each of the above described series of processes, also reuses the pixel data of the above described second subject pixel string and the above described second horizontal reference pixel string read in an immediately preceding process as the pixel data of the above described first horizontal reference pixel string and the above described first subject pixel string, and performs the above described judgment and the above described filter operation as to all the subject pixels of the above described first subject pixel string and the above described second subject pixel string.

In the case of such a configuration, in the filtering process, the pixel data of the second subject pixel string, the second horizontal reference pixel string, the first vertical reference pixel string and the second vertical reference pixel string is read into the storing means for work for each series of processes, and the pixel data of the second subject pixel string and the second horizontal reference pixel string read in the immediately preceding process is also reutilized as the pixel data of the first horizontal reference pixel string and the first subject pixel string. And the judgment and the filter operation are performed as to all the subject pixels of the first subject pixel string and the second subject pixel string.

Here, either of the reading and reutilization may be performed first. However, in the case where a storage area for storing the pixel data of the second subject pixel string and the second horizontal reference pixel string read in the immediately preceding process and the storage area for storing the pixel data of the second subject pixel string and the second horizontal reference pixel string to be read this time are shared in the storing means for work, it is necessary to perform the reading after the reutilization.

In addition, the reutilization means to reutilize all or a part of the pixel data of the second subject pixel string and the second horizontal reference pixel string read in the immediately preceding process as all or a part of the pixel data of the first horizontal reference pixel string and the first subject pixel string respectively, and in case of utilizing a part thereof, it is necessary to include the data of the pixel which can be the reference pixel in the pixel data utilized as the first horizontal reference pixel string.

In addition, the reutilization also means to generate (including copying) in the storing means for work the pixel data of the first horizontal reference pixel string and the first subject pixel string based on the pixel data of the second subject pixel string and the second horizontal reference pixel string read in the immediately preceding process, in addition to reutilizing in the storing means for work the pixel data of the second subject pixel string and the second horizontal reference pixel string read in the immediately preceding process as-is as the pixel data of the first horizontal reference pixel string and the first subject pixel string.

Furthermore, the image processing apparatus according to claim 7 of the present invention is the image processing apparatus according to claim 6, wherein the above described series of processes performed first for the above described expanded image reads the pixel data of the above described first subject pixel string, the above described second subject pixel string, the above described second horizontal reference pixel string, the above described first vertical reference pixel string and the above described second vertical reference pixel string into the above described storing means for work, and the above described series of processes performed for the second time and thereafter reads the pixel data of the above described second subject pixel string, the above described second horizontal reference pixel string, the above described first vertical reference pixel string and the above described second vertical reference pixel string into the above-described storing means for work, and also reuses the pixel data of the above described second subject pixel string and the above described second horizontal reference pixel string read in the immediately preceding process as the pixel data of the above described first horizontal reference pixel string and the above described first subject pixel string.

In the case of such a configuration, as for the expanded image, first in the series of processes, the pixel data of the first subject pixel string, the second subject pixel string, the second horizontal reference pixel string, the first vertical reference pixel string and the second vertical reference pixel string is read into the storing means for work.

As for the expanded image, in the series of processes performed for the second time and thereafter, the pixel data of the second subject pixel string, the second horizontal reference pixel string, the first vertical reference pixel string and the second vertical reference pixel string is read into the storing means for work, and the pixel data of the second subject pixel string and the second horizontal reference pixel string read in the immediately preceding process is also reutilized as the pixel data of the first horizontal reference pixel string and the first subject pixel string respectively.

Therefore, while the pixel data of the five pixel strings is read only at the start, the pixel data of the four pixel strings is read for the second time and thereafter.

Furthermore, the image processing apparatus according to claims 8 of the present invention is the image processing apparatus according to either claim 6 or 7, wherein, in the case where the process of copying the pixel data of the above described second subject pixel string and the above described second horizontal reference pixel string read in the immediately preceding process as the pixel data of the above described first horizontal reference pixel string and the above described first subject pixel string respectively is the first phase, the process of reading the pixel data of the above described first vertical reference pixel string into the above described storing means for work is the second phase, the process of reading the pixel data of the above described second vertical reference pixel string into the above described storing means for work is the third phase, the process of reading the pixel data of the above described second subject pixel string into the above described storing means for work is the fourth phase, the process of reading the pixel data of the above described second horizontal reference pixel string into the above described storing means for work is the fifth phase, the process of performing the above described horizontal filter operation as to each subject pixel of the above described first subject pixel string based on the pixel data of the above described first horizontal reference pixel string is the sixth phase, the process of performing the above described judgment and the above described vertical filter operation as to each subject pixel of the above described first subject pixel string based on processing results of the above described sixth phase and the pixel data of the above described first vertical reference pixel string is the seventh phase, the process of performing the above described horizontal filter operation as to each subject pixel of the above described second subject pixel string based on the pixel data of the above described second horizontal reference pixel string is the eighth phase, and the process of performing the above described judgment and the above described vertical filter operation as to each subject pixel of the above described second subject pixel string based on the processing results of the above described eighth phase and the pixel data of the above described second vertical reference pixel string is the ninth phase, the above described series of processes performs the above described first phase, the above described second phase, the above described third phase, the above described fourth phase and the above described fifth phase in that order, performs the above described sixth phase and the above described seventh phase in that order, performs the above described fifth phase, and the above described eighth phase and the above described ninth phase in that order, and also starts performing the above described second phase and the above described sixth phase at the same time and performing the above described third phase and the above described seventh phase at the same time.

In the case of such a configuration, as the first phase is performed by the series of processes, the pixel data of the second subject pixel string and the second horizontal reference pixel string read in the immediately preceding process is copied as the pixel data of the first horizontal reference pixel string and the first subject pixel string.

Although the pixel data of the first horizontal reference pixel string and the first subject pixel string is necessary to perform the horizontal filter operation as to each subject pixel of the first subject pixel string, it is available by performing the first phase, so that the sixth phase can be performed when starting to perform the second phase. Therefore, performance of the second phase and the sixth phase is simultaneously started. Thus, the pixel data of the first vertical reference pixel string is read into the storing means for work, and the horizontal filter operation is performed as to each subject pixel of the first subject pixel string based on the pixel data of the first horizontal reference pixel string.

Furthermore, although the results of the horizontal filter operation and the pixel data of the first vertical reference pixel string are necessary in order to perform the judgment and the vertical filter operation as to each subject pixel of the first subject pixel string, they are available by performing the second and sixth phases, so that the seventh phase can be performed when starting to perform the third phase. Therefore, performance of the third and seventh phases are simultaneously started. Thus, the pixel data of the second vertical reference pixel string is read into the storing means for work, and the judgment and vertical filter operation are performed as to each subject pixel of the first subject pixel string based on the processing results of the sixth phase and the pixel data of the first vertical reference pixel string.

And the fourth and fifth phases are performed in that order so that the pixel data of the second subject pixel string and the second horizontal reference pixel string is read into the storing means for work.

Although the pixel data of the second horizontal reference pixel string and the second subject pixel string is necessary in order to perform the horizontal filter operation as to each subject pixel of the second subject pixel string, it is available by performing the fourth and fifth phases, so that the eighth phase can be performed following the end of the fifth phase. Thus, the horizontal filter operation is performed as to each subject pixel of the second subject pixel string based on the pixel data of the second horizontal reference pixel string.

Furthermore, although the results of the horizontal filter operation and the pixel data of the second vertical reference pixel string are necessary in order to perform the judgment and the vertical filter operation as to each subject pixel of the second subject pixel string, they are available by performing the third and eighth phases, so that the ninth phase can be performed following the end of the eighth phase. Thus, the judgment and vertical filter operation are performed as to each subject pixel of the second subject pixel string based on the processing results of the eighth phase and the pixel data of the second vertical reference pixel string.

On the other hand, in order to attain the above objects, the image processing program according to claim 9 of the present invention is a program for, based on the compressed image data compressed by the image compressing process for performing the discrete cosine transform process and the quantization process by the predetermined block, causing the computer to perform the filtering process to the expanded image on or after expanding the image by the above described block, wherein, in the case where a block adjacent to the subject block is the reference block, and furthermore, one pixel in the above described subject block is the subject pixel, and one pixel in the above described reference block is the reference pixel, the above described filtering process judges whether or not the difference value between the value of the above described subject pixel and the value of the above described reference pixel is exceeding the threshold, determines whether or not to perform the filter operation as to the above described subject pixel based solely on the above described judgment result, and performs the filter operation as to the above described subject pixel based solely on the value of the above described subject pixel and the value of the above described reference pixel.

In the case of such a configuration, the action equivalent to that of the image processing apparatus according to claim 1 can be obtained by having the program read by the computer and having the process executed by the computer according to the read program.

Furthermore, the image processing program according to claim 10 of the present invention is the program for, based on the compressed image data compressed by the image compressing process for performing the discrete cosine transform process and the quantization process by the predetermined block, causing a computer to perform the filtering process to the expanded image on or after expanding the image by the above described block, wherein, in the case where the block horizontally adjacent to the subject block is the horizontal reference block, the block vertically adjacent to the above described subject block is the vertical reference block, and furthermore, one pixel in the above described subject block is the subject pixel, and one pixel in the above described horizontal reference block located on the boundary with the above described subject block and at the same vertical position as the above described subject pixel is the horizontal reference pixel, and one pixel in the above described vertical reference block located on the boundary with the above described subject block and at the same horizontal position as the above described subject pixel is a vertical reference pixel, the above described filtering process judges whether or not the difference value between the value of the above described subject pixel and the value of the above described vertical reference pixel is exceeding the threshold, the above described filtering process performs the horizontal filter operation as to the above described subject pixel based solely on the value of the above described subject pixel and the value of the above described horizontal reference pixel, the above described filtering process determines whether or not to perform the vertical filter operation as to the above described subject pixel based solely on the above described judgment result, and performs the vertical filter operation as to the above described subject pixel based solely on the value of the above described subject pixel and the value of the above described vertical reference pixel.

In the case of such a configuration, the action equivalent to that of the image processing apparatus according to claim 2 can be obtained by having the program read by the computer and having the process executed by the computer according to the read program.

On the other hand, in order to attain the above objects, the image processing method according to claim 11 of the present invention is the method for, based on the compressed image data compressed by the image compressing process for performing the discrete cosine transform process and the quantization process by the predetermined block, performing the filtering process to the expanded image on or after expanding the image by the above described block, wherein, in the case where the block adjacent to the subject block is the reference block, and furthermore, one pixel in the above described subject block is the subject pixel, and one pixel in the above described reference block is the reference pixel, the above described filtering process judges whether or not the difference value between the value of the above described subject pixel and the value of the above described reference pixel is exceeding the threshold, determines whether or not to perform the filter operation as to the above described subject pixel based solely on the above described judgment result, and performs the filter operation as to the above described subject pixel based solely on the value of the above described subject pixel and the value of the above described reference pixel.

Furthermore, the image processing method according to claim 12 of the present invention is the method for, based on the compressed image data compressed by the image compressing process for performing the discrete cosine transform process and the quantization process by the predetermined block, performing the filtering process to the expanded image on or after expanding the image by the above described block, wherein, in the case where the block horizontally adjacent to the subject block is the horizontal reference block, the block vertically adjacent to the above described subject block is the vertical reference block, and furthermore, one pixel in the above described subject block is the subject pixel, and one pixel in the above described horizontal reference block located on the boundary with the above described subject block and at the same vertical position as the above described subject pixel is a horizontal reference pixel, and one pixel in the above described vertical reference block located on the boundary with the above described subject block and at the same horizontal position as the above described subject pixel is the vertical reference pixel, the above described filtering process judges whether or not the difference value between the value of the above described subject pixel and the value of the above described vertical reference pixel is exceeding the threshold, the above described filtering process performs the horizontal filter operation as to the above described subject pixel based solely on the value of the above described subject pixel and the value of the above described horizontal reference pixel, the above described filtering process determines whether or not to perform the vertical filter operation as to the above-described subject pixel based solely on the above described judgment result, and performs the vertical filter operation as to the above described subject pixel based solely on the value of the above described subject pixel and the value of the above described vertical reference pixel.

BRIEF DESCRIPTION OF THE DRAWINGS

FIG. 1 is a block diagram showing a configuration of a computer system to which the present invention is applied to;

FIG. 3 is a bar graph showing values of subject pixels $v_0$ to $v_7$ on the same horizontal line in mutually adjacent blocks A and B;

DETAILED DESCRIPTION OF THE PREFERRED EMBODIMENTS

Figure 1:
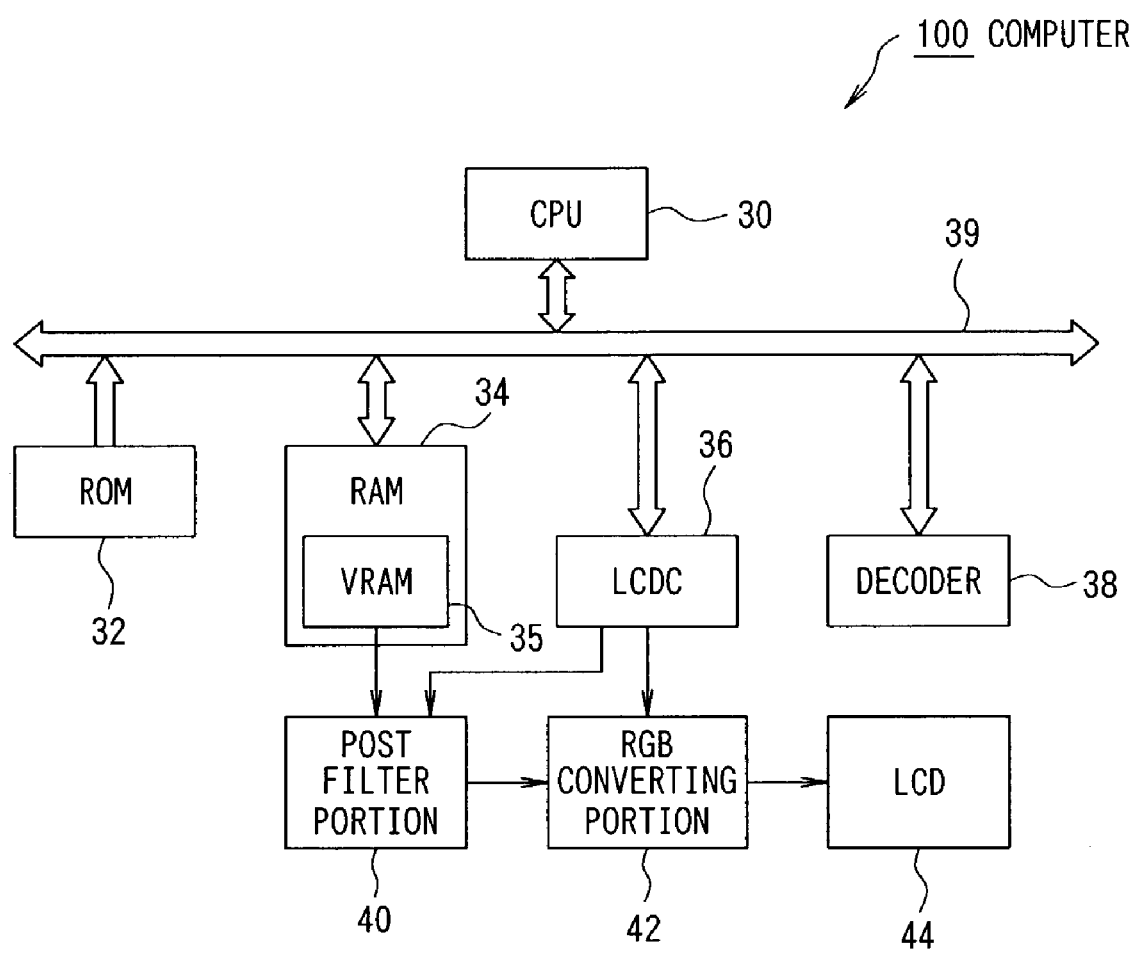

Hereafter, the embodiments of the present invention will be described by referring to the drawings. FIGS. 1 to 13 are diagrams showing the embodiments of an image processing apparatus, an image processing program and an image processing method related to the present invention.

These embodiments apply the image processing apparatus, image processing program and image processing method related to the present invention to the case of, when decoding motion picture data compressed in an MPEG format and reproducing a motion picture by a multitasking OS (operating system) in a computer 100 as shown in FIG. 1, performing a filtering process for reducing block noise to a reproduced image (hereafter, referred to as a deblock filtering process).

First, a configuration of a computer system to which the present invention is applied will be described by referring to FIG. 1. FIG. 1 is a block diagram showing the configuration of the computer system to which the present invention is applied.

As shown in FIG. 1, the computer 100 is comprised of a CPU 30 for controlling calculation and the entire system based on a control program, an ROM 32 for having the control program of the CPU 30 and so on stored in a predetermined area in advance, an RAM 34 for storing data read from the ROM 32 and calculation results necessary in a calculation process of the CPU 30, an LCDC (Liquid Crystal Display Controller) 36 for converting the data of a specific area of the RAM 34 into an image signal and outputting it to an LCD 44, a decoder 38 for decoding motion picture data, a post filter portion 40 for reading the data of the specific area of the RAM 34 and performing the deblock filtering process, an RGB converting portion 42 for performing coloring conversion to the data from the post filter portion 40, and an LCD 44 for performing display based on the data from the RGB converting portion 42. And the CPU 30, ROM 32, RAM 34, LCDC 36 and decoder 38 are connected mutually and to be able to send and receive the data by a bus 39 which is a signal line for transferring the data.

The RAM 34 has a VRAM 35, as a specific area, for storing the data to be displayed on the LCD 44, and the VRAM 35 is capable of being accessed independently by the apparatus connected to the bus 39 such as the CPU 30 and by the post filter portion 40. In addition, the VRAM 35 has at least two areas capable of storing image data of one screen of the LCD 44 so that one of the areas is for expansion of the motion picture data by the decoder 38 and the other area is for the reading by the post filter portion 40, and these areas are alternately switched and used in a predetermined cycle.

The LCDC 36 controls the post filter portion 40 and the RGB converting portion 42 and thereby reads the data of the VRAM 35 sequentially from a first address in a predetermined cycle so as to output the read data to the LCD 44 by converting it into the image signal. To be more specific, under the control of the LCDC 36, the post filter portion 40 reads the data from the VRAM 35, performs the deblock filtering process to the read data and outputs it to the RGB converting portion 42 so that, under the control of the LCDC 36, the RGB converting portion 42 performs RGB conversion to the data from the post filter portion 40 and outputs it to the LCD 44.

The decoder 38 sequentially decodes the image data included in the motion picture data every predetermined time T (20 [ms] for instance). To be more specific, on an instruction to start decoding from the CPU 30, the motion picture data compressed in the MPEG format is read from the RAM 34, and the image data is decoded in the MPEG format to the VRAM 35 based on the read motion picture data. The VRAM 35 has the image data expanded therein in the units of pixel data (YUV data) showing a degree of color of one pixel of the LCD 44. In addition, the decoder 38 performs an IDCT (Inverse Discrete Cosine Transform) process and a motion compensation process of the decoding process in the MPEG format. Moreover, a compression process and a decoding process in the MPEG format are per past examples.

Next, the configuration of the post filter portion 40 will be described in detail.

The post filter portion 40 has the configuration and internal processing thereof implemented by hardware, has a buffer capable of storing the pixel data of 21 pixels, divides the reproduced image into a plurality of blocks, and while reading the pixel data from the VRAM 35 to the buffer, it performs the deblock filtering process in the unit of a block based on the read pixel data. Each block is constituted as a rectangular image area comprised of 8 pieces of pixel horizontally and 8 pieces of pixel vertically, and furthermore, is divided into four areas of upper left, upper right, lower left and lower right comprised of 4 pieces of pixel horizontally and 4 pieces of pixel vertically.

Figure 2:
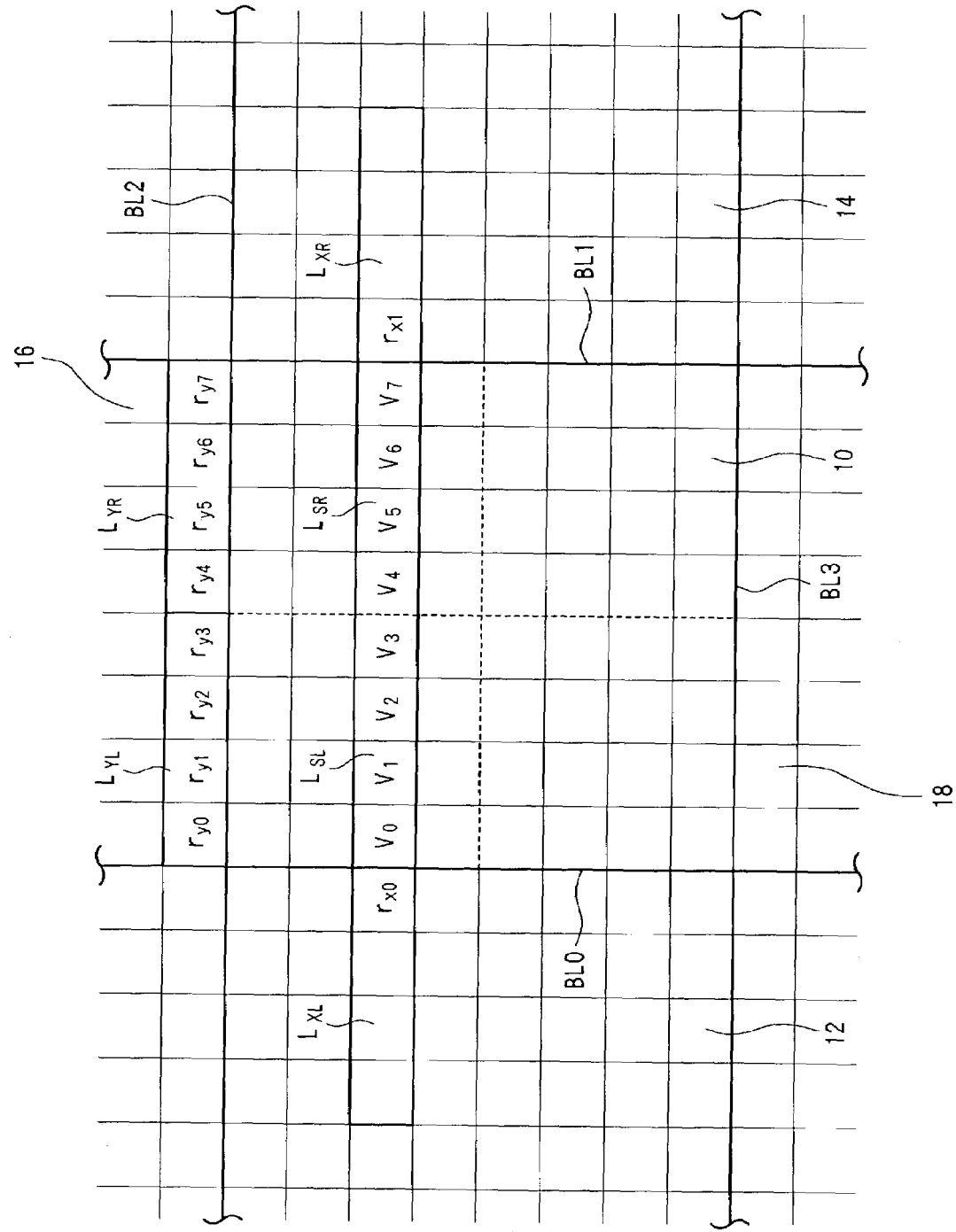
FIG. 2 is a diagram showing a subject block which is a subject of a deblock filtering process in a reproduced image and a block adjacent thereto.
Figure 4:
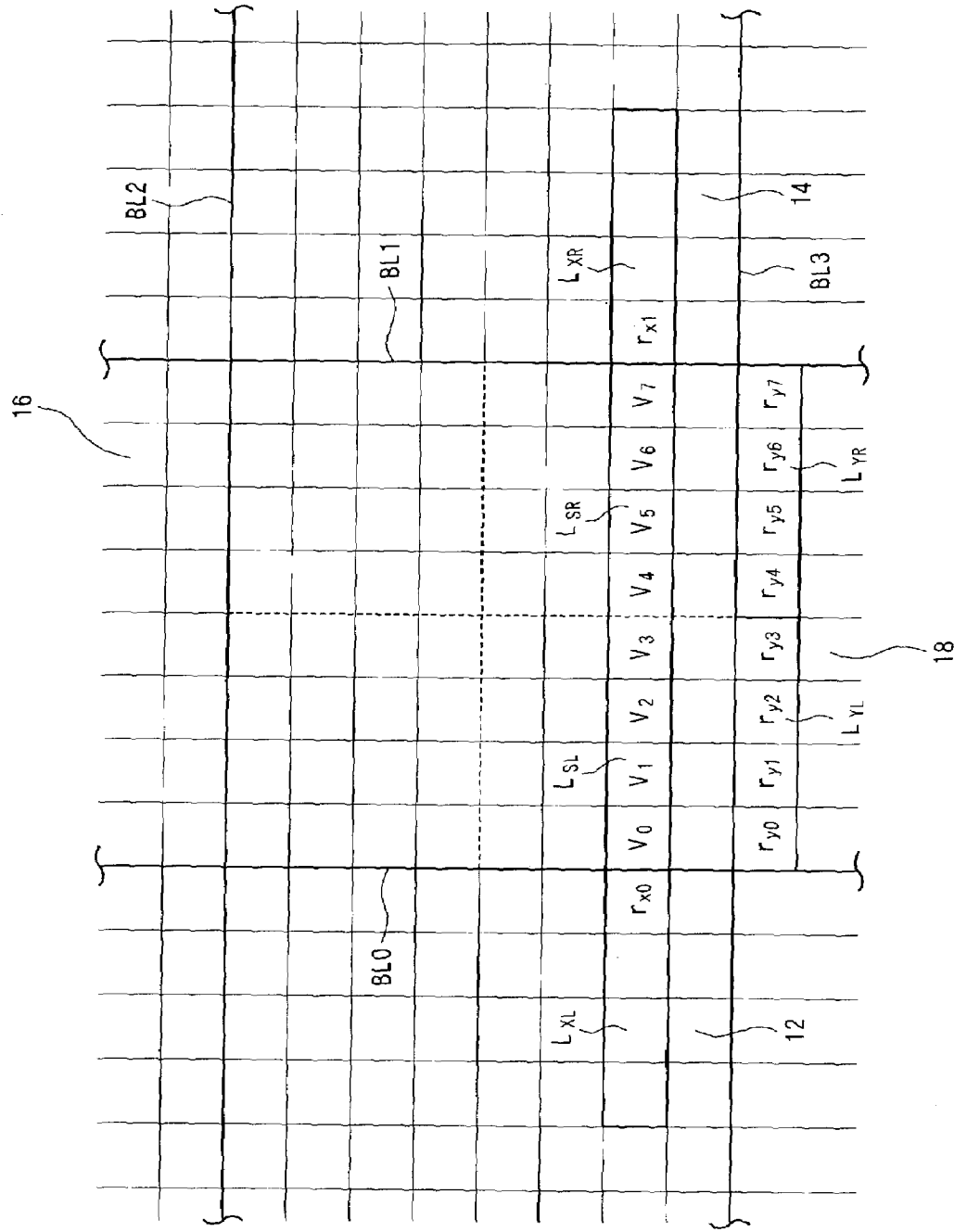
FIG. 4 is a diagram showing the subject block which is the subject of the deblock filtering process in the reproduced image and the block adjacent thereto.

A principle of the deblock filtering process related to the present invention will be described in detail by referring to FIG. 2 to FIG. 4. FIG. 2 and FIG. 4 are diagrams showing the subject block which is the subject of the deblock filtering process and the block adjacent thereto.

In FIG. 2, on the left and on the right of a subject block 10, a horizontal reference block 12 is adjacent thereto sandwiching a boundary BL0 and a horizontal reference block 14 is adjacent thereto sandwiching a boundary BL1 respectively. Furthermore, on the upper and the lower of the subject block 10, a vertical reference block 16 is adjacent thereto sandwiching a boundary BL2 and a vertical reference block 18 is adjacent thereto sandwiching a boundary BL3 respectively.

In the deblock filtering process related to the present invention, the pixels on the same horizontal line in the subject block 10 are the subject pixels, and the subject 8 pixels are collectively processed by filtering. In the example of FIG. 2, the pixels on the same horizontal line belonging to an upper half of the subject block 10 are subject pixels $v_0$ to $v_7$. Here, in the case where the pixel string comprised of the four pixels of the left half of the pixels on the same horizontal line is a first subject pixel string $L_{SL}$, and the pixel string comprised of the four pixels of the right half is a second subject pixel string $L_{SR}$, the first subject pixel string $L_{SL}$ includes the subject pixels $v_0$ to $v_3$ in order from the left, and the second subject pixel string $L_{SR}$ includes the subject pixels $v_4$ to $v_7$ in order from the left.

In addition, in the case where the pixel string in the horizontal reference block 12 adjacent to the first subject pixel string $L_{SL}$ on the left of it and comprised of four pixels is a first horizontal reference pixel string $L_{XL}$ and the pixel string in the horizontal reference block 14 adjacent to the second subject pixel string $L_{SR}$ on the right of it and comprised of four pixels is a second horizontal reference pixel string $L_{XR}$, the first horizontal reference pixel string $L_{XL}$ includes a reference pixel $r_{x0}$ at its right end, and the second horizontal reference pixel string $L_{XR}$ includes a reference pixel $r_{x1}$ at its left end. The reference pixel $r_{x0}$ is used for horizontal filter operation as to the subject pixels $v_0$ to $v_3$, and the reference pixel $r_{x1}$ is used for the horizontal filter operation as to the subject pixels $v_4$ to $v_7$.

In addition, in the case where the pixel string of the lowest step in the vertical reference block 16 located above the first subject pixel string $L_{SL}$ and comprised of four pixels is a first vertical reference pixel string $L_{YL}$ and the pixel string of the lowest step in the vertical reference block 16 located above the second subject pixel string $L_{SR}$ and comprised of four pixels is a second vertical reference pixel string $L_{YR}$, the first vertical reference pixel string $L_{YL}$ includes the reference pixels $r_{y0}$ to $r_{y3}$ in order from the left, and the second vertical reference pixel string $L_{YR}$ includes the subject pixels $r_{y4}$ to $r_{y7}$ in order from the left. The reference pixels $r_{y0}$ to $r_{y3}$ are used for vertical filter operation as to the subject pixels $v_0$ to $v_3$, and the reference pixel $r_{y4}$ to $r_{y7}$ are used for the vertical filter operation as to the subject pixels $v_4$ to $v_7$.

In the example of FIG. 2, in case of performing the horizontal filter operation as to the subject pixels $v_0$ to $v_7$ by the deblock filtering process related to the present invention, the values of the subject pixels $v_{x0}'$ to $v_{x7}'$ after the deblock filtering process are calculated by the following equations (1) to (8) for the filter operation. Moreover, $v_0$ to $v_7$ indicate the values of the subject pixels, and $r_{x0}$ to $r_{x7}$ indicate the values of the reference pixels in the following equations (1) to (8).

$$v_{x0}'=(v_0+r_{x0})/2+(v_0-r_{x0})/8 \tag{1}$$

$$v_{x1}'=(v_1+r_{x0})/2+(v_1-r_{x0})/4 \tag{2}$$

$$v_{x2}'=v_2-(v_2-r_{x0})/8 \tag{3}$$

$$v_{x3}'=v_8v_3 \tag{4}$$

$$v_{x3}'=v_8v_3 \tag{4}$$

$$v_{x4}'=v_4 \tag{5}$$

$$v_{x5}'=(v_5+r_{x1})/2+(v_5-r_{x1})/4 \tag{6}$$

$$v_{x6}'=(v_6+r_{x1})/2+(v_6-r_{x1})/8 \tag{7}$$

$$v_{x7}'=(v_7+r_{x1})/2 \tag{8}$$

The above equations (1) to (8) for the filter operation are derived as follows. FIG. 3 is a bar graph showing the values of the subject pixels $v_0$ to $v_7$ on the same horizontal line in the mutually adjacent blocks A and B.

As shown in FIG. 3A, in the mutually adjacent blocks A and B, an equivalent to a direct current component of the spatial frequency component of the image is eliminated by a DCT process on compression, so that differences in levels occur due to different averages of luminance. The differences in levels become block noise. Thus, the case of smoothly connecting the images of the blocks A and B is considered in order to reduce the block noise. An average $V_A$ of the four pixels in the block A and an average $V_B$ of the four pixels in the block B can be calculated by the following equations (9) and (10).

$$V_A=(v_4+v_5+v_6+v_7)/4 \tag{9}$$

$$V_B=(v_0+v_1+v_2+v_3)/4 \tag{10}$$

If the amount of departure from the averages $V_A$ and $V_B$ of each subject pixel value $v_i$ is $\delta v_i$, each subject pixel value $v_i$ can be represented by the following equations (11) and (12).

$v_i = V_A + \delta v_i (i=4 \text{ to } 7)$ (11)

$v_i = V_B + \delta v_i (i=0 \text{ to } 3)$ (12)

Now, in order to smoothly connect the images of the blocks A and B, the difference between the averages $V_A$ and $V_B$ should be "0," and each subject pixel value $v_i$ should be corrected stepwise as shown in FIG. 3B. As the difference in level $\Delta$ of the steps is as follows.

$\Delta = (V_B - V_A)/8$ (13)

the corrected value $v_{x0}'$ of the subject pixel value $v_0$ can be calculated by the following equation (14) for instance.

$$\begin{aligned} v'_{x0} &= (V_B + V_A)/2 + \Delta + \delta v_0 \\ &= (5V_B + 3V_A)/8 + \delta v_0 \\ &= \{5(v_0 - \delta v_0) + 3(v_7 - \delta v_7)\}/8 + \delta v_0 \\ &= \{5v_0 + 3v_7 + 3(\delta v_0 - \delta v_7)\}/8 \end{aligned}$$ (14)

Here, while the above equation (14) must be observed in order to calculate a correct value, $(\delta v_0 - \delta v_7)$ is assumed to be small and is omitted in the above equation (14) so as to obtain an approximate expression which is the following equation (15).

$v_{x0}' = (5v_0 + 3v_7)/8$ (15)

In addition, as for the other subject pixels in the block B, the corrected values $v_{x1}'$ to $v_{x3}'$ can be calculated likewise by the following equations (16) to (18)

$$\begin{aligned} v'_{x1} &= (V_B + V_A)/2 + 2\Delta + \delta v_1 \\ &= \{6v_1 + 2v_7 + 2(\delta v_1 - \delta v_7)\}/8 \end{aligned}$$ (16)

$$\begin{aligned} v'_{x2} &= (V_B + V_A)/2 + 3\Delta + \delta v_2 \\ &= \{7v_2 + v_7 + (\delta v_2 - \delta v_7)\}/8 \end{aligned}$$ (17)

$$\begin{aligned} v'_{x3} &= (V_B + V_A)/2 + 4\Delta + \delta v_3 \\ &= v_3 \end{aligned}$$ (18)

Thus, the approximate expressions of the following equations (19) and (20) are obtained.

$v_{x1}' = (3v_1 + v_7)/4$ (19)

$v_{x2}' = (7v_2 + v_7)/8$ (20)

In addition, as for the subject pixels in the block A, they are the same except the difference that the value of the reference pixel is $v_0$, and the corrected values $v_{x4}'$ to $v_{x7}'$ can be calculated by the following equations (21) to (24).

$$\begin{aligned} v'_{x4} &= (V_B + V_A)/2 - 3\Delta + \delta v_4 \\ &= \{7v_4 + v_0 + (\delta v_4 - \delta v_0)\}/8 \end{aligned}$$ (21)

$$\begin{aligned} v'_{x5} &= (V_B + V_A)/2 - 2\Delta + \delta v_5 \\ &= \{6v_5 + 2v_0 + 2(\delta v_5 - \delta v_0)\}/8 \end{aligned}$$ (22)

$$\begin{aligned} v'_{x6} &= (V_B + V_A)/2 - \Delta + \delta v_6 \\ &= \{5v_6 + 3v_0 + (\delta v_6 - \delta v_0)\}/8 \end{aligned}$$ (23)

$$\begin{aligned} v'_{x7} &= (V_B + V_A)/2 + \delta v_7 \\ &= \{v_7 + v_0 + 2\delta v_7\}/2 \end{aligned}$$ (24)

Thus, the approximate expressions of the following equations (25) to (28) are obtained.

$v_{x4}' = v_4$ (25)

$v_{x5}' = (3v_5 + v_0)/4$ (26)

$v_{x6}' = (5v_6 + 3v_0)/8$ (27)

$v_{x7}' = (v_7 + v_0)/2$ (28)

In addition, as bit shift rather than division can accelerate the processing in actual calculation, the above equations (15), (19), (20), (18), (25) to (28) are transformed to the above equations (1) to (8) and used. This deblock filtering process is performed to a horizontal pixel string and a vertical pixel string respectively. As for the amount of calculation, it requires addition and subtraction twice respectively and bit shift four times for one pixel. The bit shift does not become much of a load when rendering it as hardware. As a post filter in the past took a weighting average of maximum 7×7 pixels per pixel, the amount of calculation can be significantly reduced compared thereto.

Likewise, as for the example in FIG. 2, in case of performing vertical filter operation as to the subject pixels $v_{x0}'$ to $v_{x7}'$ by the deblock filtering process related to the present invention, the values $v_{yi}'$ (I=0 to 7) of the subject pixels after the deblock filtering process can be calculated by a filter operation equation of the following equation (29). Moreover, $r_{y1}$ indicates the value of the reference pixel in the following equation (29) to (36).

$v_{yi}' = v_{xi}' - (v_{xi}' - r_{yi})/8$ (29)

As for the example in FIG. 2, the subject pixels $v_0$ to $v_7$ are positioned in the third step in the subject block 10, the filter operation equation of the above equation (29) is corresponding to the above equation (3). Therefore, when the subject pixels $v_0$ to $v_7$ are positioned in the first, second and fourth steps, the filter operation equations are corresponding to the above equations (1), (2) and (4) as shown in the following equation (30) to (32), and when the subject pixels $v_0$ to $V_7$ are positioned in the fifth to eighth steps, the filter operation equations are corresponding to the above equations (5) to (8) as shown in the following equation (33) to (36). However, when the subject pixels $v_0$ to $v_7$ are positioned in the fifth to eighth steps, as shown in FIG. 4, the first vertical reference pixel string $L_{YL}$ is the pixel string of the highest step in the vertical reference block 18 and is located below the first subject pixel string $L_{SL}$ and comprised of four pixels, and the second vertical reference pixel string $L_{YR}$ is the pixel string of the highest step in the vertical reference block 18 and is located below the second subject pixel string $L_{SR}$ and comprised of four pixels.

$v_{yi}' = (v_{xi}' + r_{yi})/2 + (v_{xi}' - r_{yi})/8$ (30)

$v_{yi}' = (v_{xi}' + r_{yi})/2 + (v_{xi}' - r_{yi})/4$ (31)

$v_{yi}' = v_{xi}'$ (32)

$v_{yi}' = v_{xi}'$ (33)

$v_{yi}' = (v_{xi}' + r_{yi})/2 + (v_{xi}' - r_{yi})/4$ (34)

$v_{yi}' = (v_{xi}' + r_{yi})/2 + (v_{xi}' - r_{yi})/8$ (35)

$v_{yi}' = (v_{xi}' + r_{yi})/2$ (36)

To be more specific, the deblock filtering process related to the present invention can be implemented by a main control process, a pixel data reading process, a first horizontal filter processing, a first vertical filter processing, a second horizontal filter processing and a second vertical filter processing shown in the flowcharts in FIGS. 5 to 10.

Figure 5:
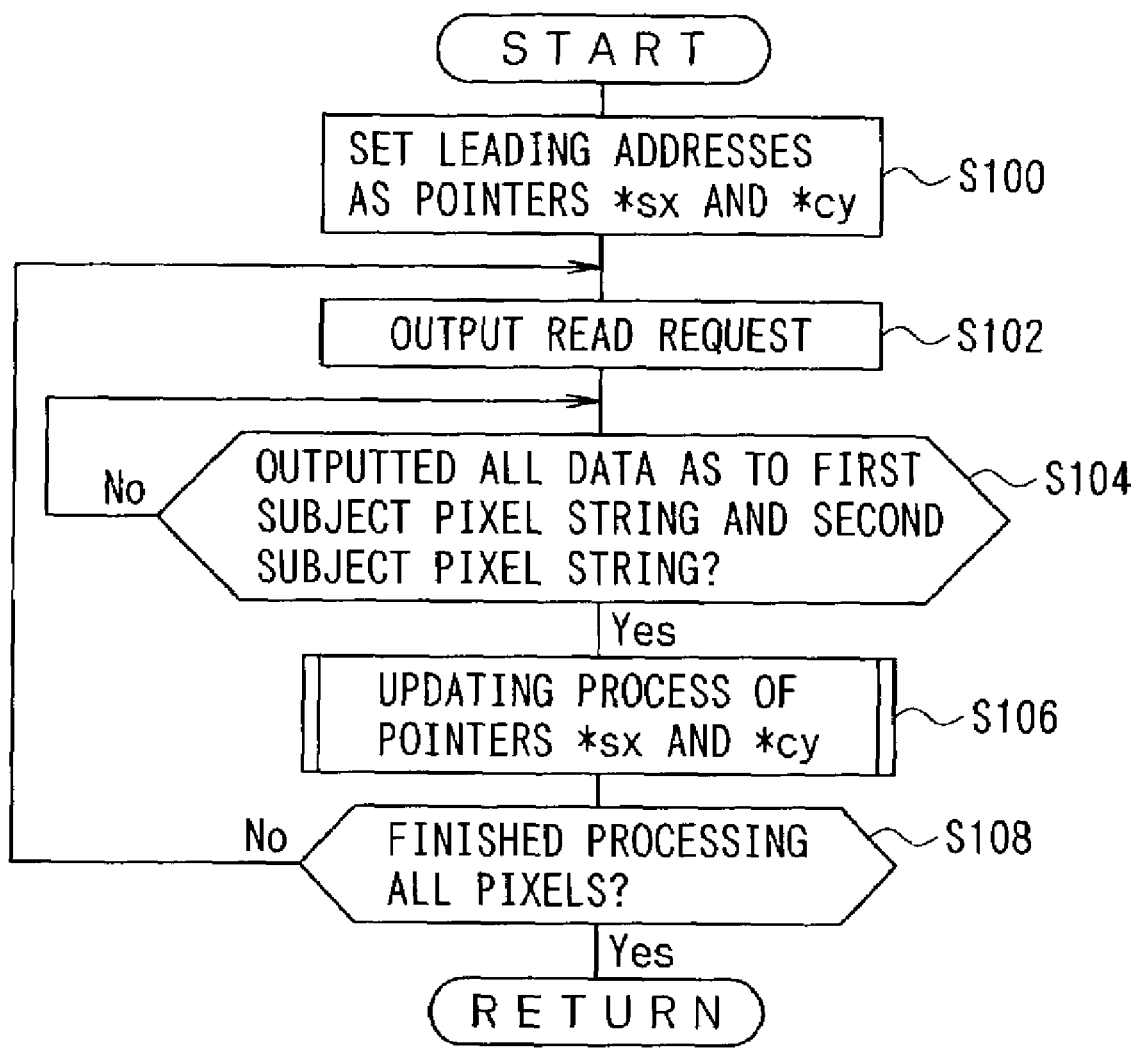
FIG. 5 is a flowchart showing a main control process.

First, the main control process will be described in detail by referring to FIG. 5. FIG. 5 is a flowchart showing the main control process.

If performed in the post filter portion 40, the main control process moves on to a step S100 as shown in FIG. 5.

In the step S100, it sets as a pointer for the subject pixel *sx an address at which the pixel data of the leftmost pixel of the first subject pixel string $L_{SL}$ to be processed first in the VRAM 35 is stored, and sets as a pointer for the vertical reference pixel *cy an address at which the pixel data of the left most pixel of the first vertical reference pixel string $L_{YL}$ to be processed first in the VRAM 35 is stored respectively. Here, the pointer for the subject pixel *sx is used to read from the VRAM 35 the pixel data of the first subject pixel string $L_{SL}$, the second subject pixel string $L_{SR}$ and the second horizontal reference pixel string $L_{XR}$. In addition, the pointer for the vertical reference pixel *cy is used to read from the VRAM 35 the first vertical reference pixel string $L_{YL}$ and the second vertical reference pixel string $L_{YR}$.

Next, it moves onto a step S102, and refers to the pointer for the subject pixel *sx and the pointer for the vertical reference pixel *cy, and outputs a read request to read the first subject pixel string $L_{SL}$, second subject pixel string $L_{SR}$, second horizontal reference pixel string $L_{XR}$, first vertical reference pixel string $L_{YL}$ and second vertical reference pixel string $L_{YR}$ from the VRAM 35, and moves on to a step S104.

In the step S104, it judges, by a first vertical filtering process and a second vertical filtering process mentioned later, whether or not all the pixel data after the filtering process has been outputted to the RGB converting portion 42 as to the subject pixels of the first subject pixel string $L_{SL}$ and second subject pixel string $L_{SR}$, and if it judges that all the pixel data after the filtering process has been outputted thereto (Yes), it moves on to a step S106, but if it judges otherwise (No), it waits in the step S104 until all the pixel data after the filtering process is outputted to the RGB converting portion 42.

In the step S106, it performs a pointer updating process of updating the pointer for the subject pixel *sx and the pointer for the vertical reference pixel *cy, and moves on to a step S108 to judge whether or not the filtering process has been finished as to all the pixels of the reproduced image, and if it judges that the filtering process has been finished as to all the pixels of the reproduced image (Yes), it finishes the series of processes and has the original process returned.

On the other hand, if it judges that the filtering process has not been finished as to all the pixels of the reproduced image (No), it moves on to the step S102.

Figure 6:
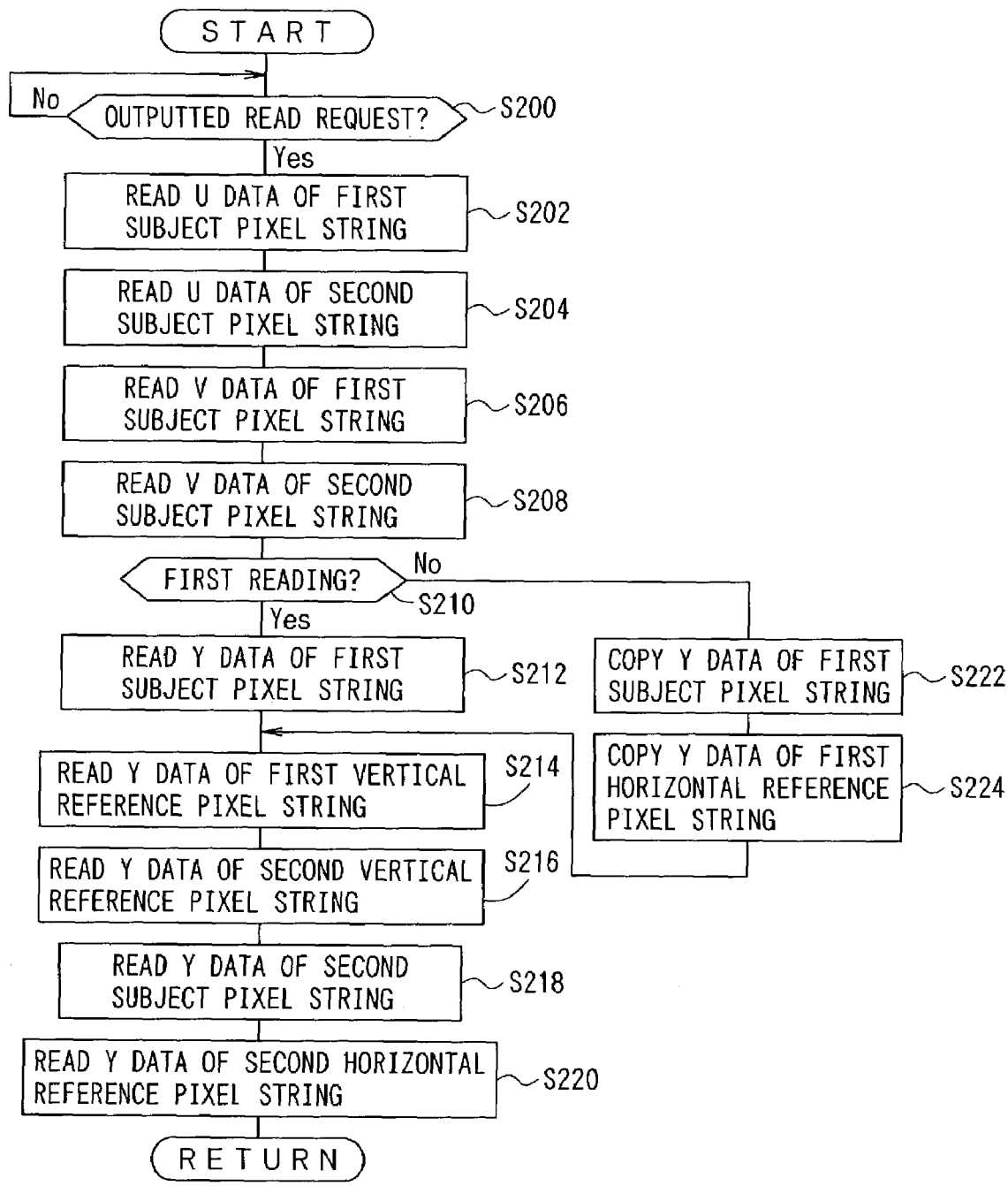
FIG. 6 is a flowchart showing a pixel data reading process.

Next, the pixel data reading process will be described in detail by referring to FIG. 6. FIG. 6 is a flowchart showing the pixel data reading process.

The pixel data reading process is the process of, according to the read request, reading the first subject pixel string $L_{SL}$, second subject pixel string $L_{SR}$, second horizontal reference pixel string $L_{XR}$, first vertical reference pixel string $L_{YL}$ and second vertical reference pixel string $L_{YR}$ from the VRAM 35 to the buffer, and if performed in the post filter portion 40, it first moves on to a step S200 as shown in FIG. 6.

In the step S200, it judges whether or not the read request has been outputted, and if it judges the read request has been outputted (Yes), it moves on to a step S202, but if it judges otherwise (No), it waits in the step S200 until the read request is outputted.

In the step S202, it refers to the pointer for the subject pixel *sx and reads U data showing a U component of the pixel data of the subject pixels $v_0$ to $v_3$ of the first subject pixel string $L_{SL}$. As this embodiment constitutes the U data as one piece of data for every two pixels, it reads the U data of the subject pixels $v_0$ and $v_1$ and the U data of the subject pixels $v_2$ and $v_3$ in the step S202. Moreover, as for the U data, priority is given to acceleration of processing and no deblock filtering process is performed since no significant effect is obtained even if the filtering process is performed.

Next, it moves on to a step S204, and refers to the pointer for the subject pixel *sx and reads the U data of the pixel data of the subject pixels $v_4$ to $v_7$ of the second subject pixel string $L_{SR}$, and moves on to a step S206.

Next, it moves on to the step S206, and refers to the pointer for the subject pixel *sx and reads V data showing a V component of the pixel data of the subject pixels $v_0$ to $v_3$ of the first subject pixel string $L_{SL}$. As this embodiment constitutes the V data as one piece of data for every two pixels, it reads the V data of the subject pixels $v_0$ and $v_1$ and the V data of the subject pixels $V_2$ and $v_3$ in the step S206. Moreover, as for the V data, priority is given to acceleration of the processing and no deblock filtering process is performed since no significant effect is obtained even if the filtering process is performed.

Next, it moves onto a step S208, and refers to the pointer for the subject pixel *sx and reads the V data of the pixel data of the subject pixels $v_4$ to $v_7$ of the second subject pixel string $L_{SR}$, and moves on to a step S210.

In the step S210, it judges as to the reproduced image whether or not it is a first reading, and if it judges that it is the first reading (Yes), it moves on to a step S212, and refers to the pointer for the subject pixel *sx and reads Y data showing a Y component of the pixel data of the subject pixels $v_0$ to $V_3$ of the first subject pixel string $L_{SL}$. As this embodiment constitutes the Y data as one piece of data per pixel, it reads the V data of the subject pixels $v_0$ and $v_3$ in the step S212.

Next, it moves on to a step S214, and refers to the pointer for the vertical reference pixel *cy to read the Y data of the pixel data of the subject pixels $r_{y0}$ to $r_{y3}$ of the first vertical reference pixel string $L_{YL}$, and then moves on to a step S216 and refers to the pointer for the vertical reference pixel *cy to read the Y data of the pixel data of the subject pixels $r_{y4}$ to $r_{y7}$ of the second vertical reference pixel string $L_{YR}$, and moves on to a step S218.

In the step S218, it refers to the pointer for the subject pixel *sx and reads the Y data of the pixel data of the subject pixels $v_4$ to $v_7$ of the second subject pixel string $L_{SR}$, and moves onto a step S220 and refers to the pointer for the subject pixel *sx and reads the Y data of the pixel data of the subject pixels (including the reference pixel $r_{x1}$) of the second horizontal reference pixel string $L_{XR}$ so as to finish the series of processes and have the original process returned.

On the other hand, in the step S210, in the case where it judges that the reproduced image is read for the second time onward (No), it moves on to a step S222, and copies in the buffer the pixel data of the second horizontal reference pixel string $L_{XR}$ read in the step S220 last time as the pixel data of the subject pixels $v_0$ to $v_3$ of the first subject pixel string $L_{SL}$, and moves on to a step S224, and copies in the buffer the data related to the rightmost pixel of the pixel data of the second subject pixel string $L_{SR}$ read in the step S220 last time as the pixel data of a reference pixel $r_{x0}$ of the first horizontal reference pixel string $L_{XL}$, and moves on to the step S214.

Figure 7:
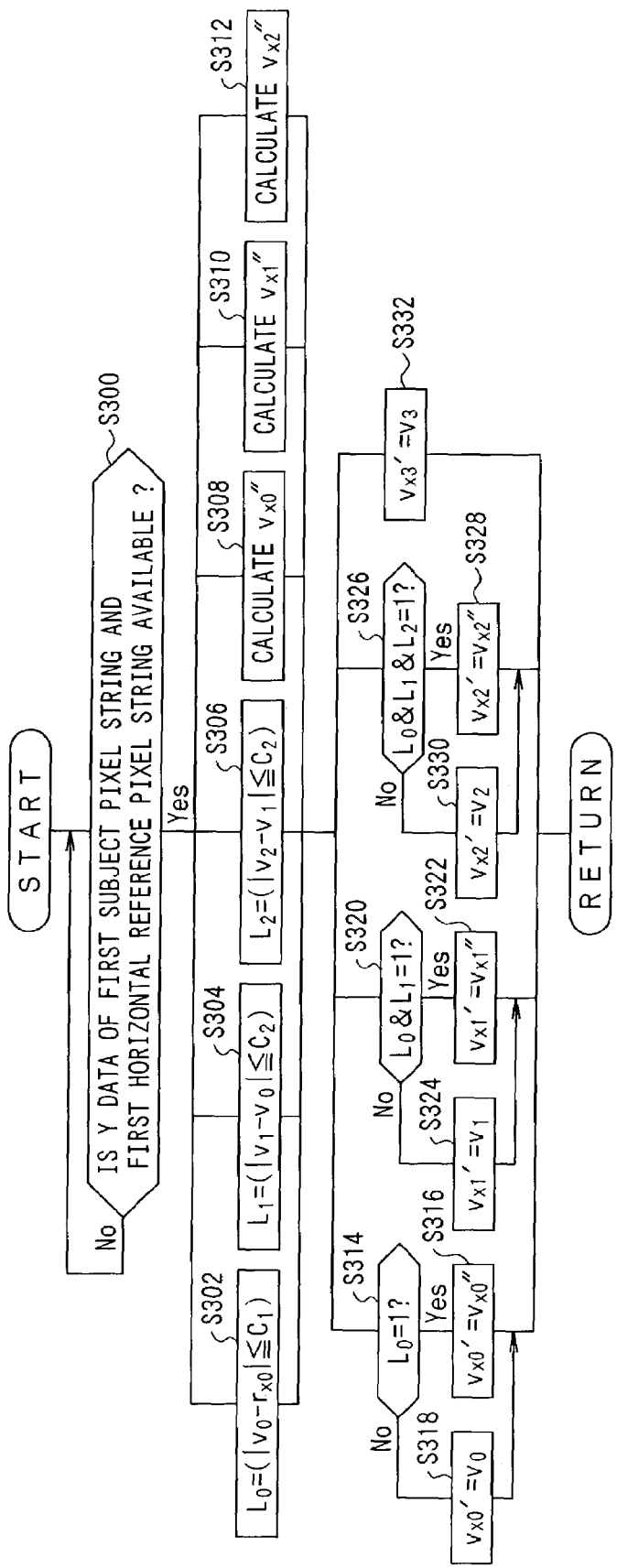
FIG. 7 is a flowchart showing a first horizontal filtering process.

Next, the first horizontal filtering process will be described in detail by referring to FIG. 7. FIG. 7 is a flowchart showing the first horizontal filtering process.

The first horizontal filtering process is the process of performing the horizontal filter operation as to the subject pixels $v_0$ to $v_3$ of the first subject pixel string $L_{SL}$, and if performed in the post filter portion 40, it first moves on to a step S300 as shown in FIG. 7.

In the step S300, it judges, by the pixel data reading process, whether or not the Y data of the subject pixels $v_0$ to $v_3$ of the first subject pixel string $L_{SL}$ and the reference pixel $r_{x0}$ of the first horizontal reference pixel string $L_{XL}$ has become available in the buffer, and if it judges that the pixel data has become available by reading or copying (Yes), it moves on to steps S302 to S312, but if it judges otherwise (No), it waits in the step S300 until the pixel data becomes available.

The steps S302 to S312 are the processes simultaneously performed as a pipeline process in the post filter portion 40.

In the step S302, it calculates a judgment value $L_0$ of whether or not an absolute value of the difference between the value of the subject pixel $v_0$ and the value of the reference pixel $r_{x0}$ is exceeding a constant value $C_1$ by the following equation (37), and moves on to steps S314, S320, S326 and S332. Here, the constant value $C_1$ is set at "32" with the maximum value of the pixel as "255." It is because, if the constant value $C_1$ is set to be excessively larger than "32," the filter processing is performed without necessity and throughput increases so that the filter processing can no longer be accelerated, and inversely, if set to be excessively smaller than "32," the filter processing is not performed even if it should be performed so that an effective filter effect cannot be expected.

$$L_0=(|v_0-r_{x0}|\leq C_1) \tag{37}$$

In the above equation (37), $L_0$ is "1" when the computing equation in the parentheses holds, and is "0" when it does not hold. Hereafter, it is the same in the steps S304, S306, S404, S413, S420, S429, S502, S504, S506, S604, S613, S620 and S629.

In the step S304, it calculates a judgment value $L_1$ of whether or not the absolute value of the difference between the value of the subject pixel $v_1$ and the value of the subject pixel $v_0$ is exceeding a constant value $C_2$ is calculated by the following equation (38), and moves on to steps S314, S320, S326 and S332. Here, the constant value $C_2$ is set at "16" with the maximum value of the pixel as "255." It is because, if the constant value $C_2$ is set to be excessively larger than "16," the filter processing is performed without necessity and the throughput increases so that the filter processing can no longer be accelerated, and inversely, if set to be excessively smaller than "16," the filter processing is not performed even if it should be performed so that the effective filter effect cannot be expected.

$$L_1=(|v_1-v_0|\leq C_2) \tag{38}$$

In the step S306, it calculates a judgment value $L_2$ of whether or not the absolute value of the difference between the value of the subject pixel $v_2$ and the value of the subject pixel $v_1$ is exceeding the constant value $C_2$ is calculated by the following equation (39), and moves on to the steps S314, S320, S326 and S332.

$$L_2=(|v_2-v_1|\leq C_2) \tag{39}$$

In the step S308, it calculates the value $v_{x0}"$ after the horizontal filter operation as to the subject pixel $v_0$ by the above equation (1), and moves on to the steps S314, S320, S326 and S332. In the step S308, it sets the value to be set as $v_{x0}'$ of the above equation (1) at $v_{x0}"$.

In the step S310, it calculates the value $v_{x1}"$ after the horizontal filter operation as to the subject pixel $v_1$ by the above equation (2), and moves on to the steps S314, S320, S326 and S332. In the step S310, it sets the value to be set as $v_{x1}'$ of the above equation (2) at $v_{x1}"$.

In the step S312, it calculates the value $v_{x2}"$ after the horizontal filter operation as to the subject pixel $v_2$ by the above equation (3), and moves on to the steps S314, S320, S326 and S332. In the step S312, it sets the value to be set as $v_{x2}'$ of the above equation (3) at $v_x"$.

The steps S314, S320, S326 and S332 are the processes simultaneously performed as the pipeline process in the post filter portion 40.

In the step S314, it judges whether or not the judgment value $L_0$ is "1," and if it judges that the judgment value $L_0$ is "1" (Yes), it moves on to the steps S316 and sets $v_{x0}"$ as a new value $v_{x0}'$ of the subject pixel $v_0$ so as to finish the series of processes and have the original process returned.

In the step S320, it judges whether or not an AND of the judgment value $L_0$ and $L_1$ is "1," and if it judges that the AND thereof is "1" (Yes), it moves on to the steps S322 and sets $v_{x1}"$ as a new value $v_{x1}'$ of the subject pixel $v_1$ so as to finish the series of processes and have the original process returned.

In the step S326, it judges whether or not an AND of the judgment value $L_0$ to $L_2$ is "1," and if it judges that the AND thereof is "1" (Yes), it moves on to the steps S328 and sets $v_{x2}"$ as a new value $v_{x2}'$ of the subject pixel $v_2$ so as to finish the series of processes and have the original process returned.

In the step S332, it sets $v_3$ as a new value $v_{x3}'$ of the subject pixel $v_3$ so as to finish the series of processes and have the original process returned.

On the other hand, in the step S314, in the case where it judges that the judgment value $L_0$ is "0" (No), it moves on to a step S318, and sets $v_0$ as a new value $v_{x0}'$ of the subject pixel $v_0$ so as to finish the series of processes and have the original process returned.

On the other hand, in the step S320, in the case where it judges that the AND of the judgment values $L_0$ and $L_1$ is "0" (No), it moves on to the step S324, and sets $v_1$ as a new value $v_{x1}'$ of the subject pixel $v_1$ so as to finish the series of processes and have the original process returned.

On the other hand, in the step S326, in the case where it judges that the AND of the judgment values $L_0$ to $L_2$ is "0" (No), it moves on to the step S330, and sets $v_2$ as a new value $v_{x2}'$ of the subject pixel $v_2$ so as to finish the series of processes and have the original process returned.

Figure 8:
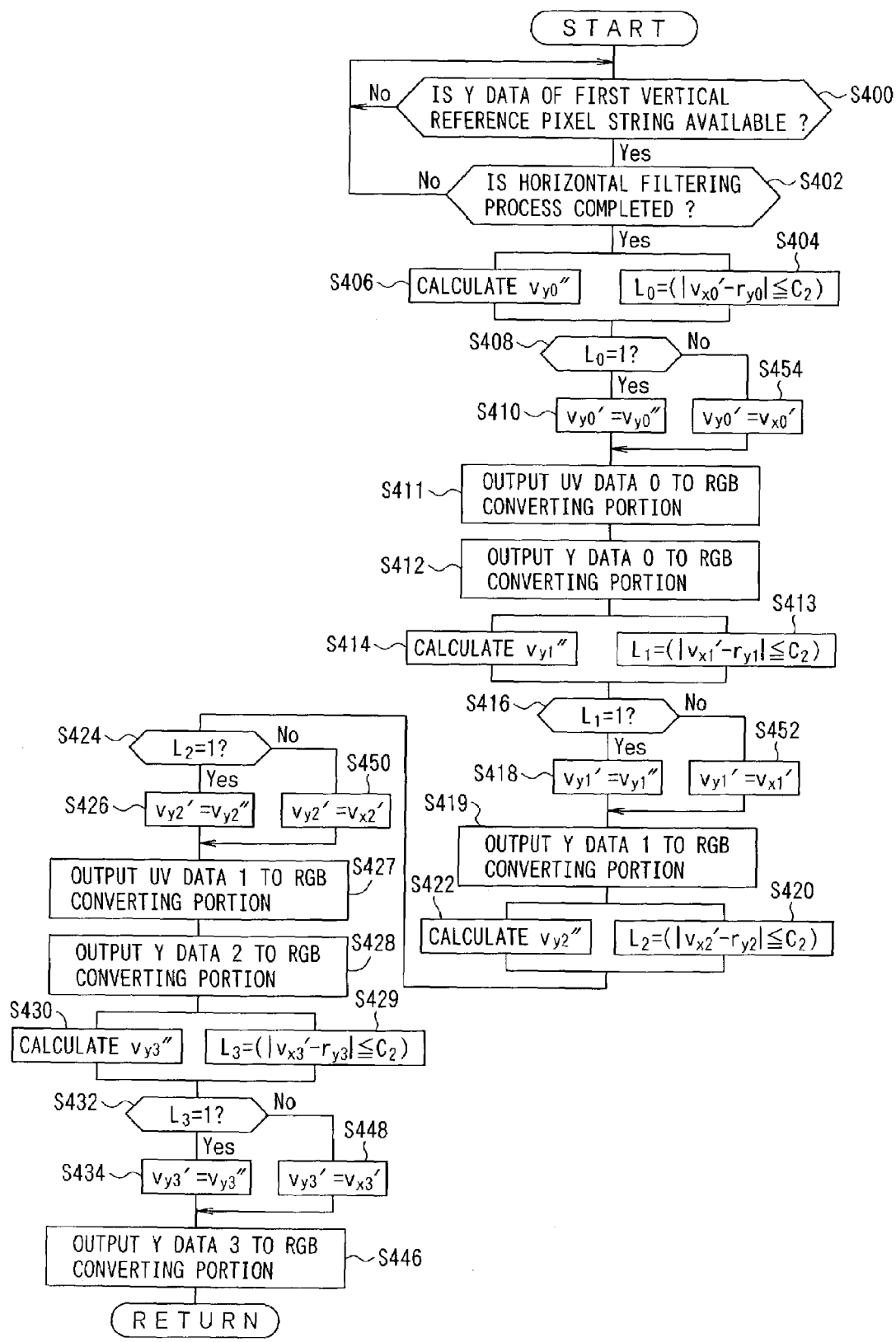
FIG. 8 is a flowchart showing a first vertical filtering process.

Next, the first vertical filtering process will be described in detail by referring to FIG. 8. FIG. 8 is a flowchart showing the first vertical filtering process.

The first vertical filtering process is the process of performing the vertical filter operation as to the subject pixels $v_0$ to $v_3$ of the first subject pixel string $L_{SL}$, and if performed in the post filter portion 40, it first moves on to a step S400 as shown in FIG. 8.

In the step S400, it judges, by the pixel data reading process, whether or not the Y data of the reference pixels $r_{y0}$ to $r_{y3}$ of the first vertical reference pixel string $L_{YL}$ has become available in the buffer, and if it judges that the pixel data has become available by reading or copying (Yes), it moves on to a step S402, but if it judges otherwise (No), it waits in the step S400 until the pixel data becomes available.

In the step S402, it judges, by the first vertical filtering process, whether or not the horizontal filter processing has been completed as to the subject pixels $v_0$ to $v_3$ of the first subject pixel string $L_{SL}$, and if it judges that the filter processing has been completed (Yes), it moves on to steps S404 and S406, but if it judges otherwise (No), it moves on to the step S400.

The steps S404 and S406 are the processes simultaneously performed as the pipeline process in the post filter portion 40.

In the step S404, it calculates the judgment value $L_0$ of whether or not the absolute value of the difference between the value of the subject pixel $v_{x0}'$ and the value of the reference pixel $r_{y0}$ is exceeding a constant value $C_2$ by the following equation (40), and moves on to a step S408. While the constant value $C_2$ is used here, the constant value $C_1$ is used instead in the case where the first subject pixel string $L_{SL}$ is positioned in the highest step or in the lowest step in the subject block 10. Hereafter, it is the same in the steps S413, S420 and S429.

$$L_0 = (|v_{x0}' - r_{y0}| \leq C_2) \tag{40}$$

In the step S406, it calculates the value $v_{y0}''$ after the vertical filter operation as to the subject pixel $v_{x0}'$ by the above equations (29) to (36) according to the vertical position of the first subject pixel string $L_{SL}$ in the subject block 10, and moves on to the steps S408. In the step S406, it sets the value to be set as $v_{y0}'$ of the above equations (29) to (36) at $v_{y0}''$.

In the step S408, it judges whether or not the judgment value $L_0$ is "1," and if it judges that the judgment value $L_0$ is "1" (Yes), it moves on to the step S410 and sets $v_{y0}''$ as a new value $v_{y0}'$ of the subject pixel $v_0$, moves on to the step S411 and outputs the U data and V data of the subject pixels $v_0$ and $v_1$ to the RGB converting portion 42, and moves on to a step S412 to output the Y data $v_{y0}''$ of the subject pixel $v_0$ to the RGB converting portion 42, and then moves on to the steps S413 and S414.

The steps S413 and S414 are the processes simultaneously performed as the pipeline process in the post filter portion 40.

In the step S413, it calculates the judgment value $L_1$ of whether or not the absolute value of the difference between the value of the subject pixel $v_{x1}'$ and the value of the reference pixel $r_{y1}$ is exceeding the constant value $C_2$ by the following equation (41), and moves on to a step S416.

$$L_1 = (v_{x1}' - r_{y1}| \leq C_2) \tag{41}$$

In the step S414, it calculates the value $v_{y1}''$ after the vertical filter operation as to the subject pixel $v_{x1}'$ by the above equations (29) to (36) according to the vertical position of the first subject pixel string $L_{SL}$ in the subject block 10, and moves on to the steps S416. In the step S414, it sets the value to be set as $v_{y1}'$ of the above equations (29) to (36) at $v_{y1}''$.

In the step S416, it judges whether or not the judgment value $L_1$ is "1," and if it judges that the judgment value $L_1$ is "1" (Yes), it moves on to the step S418 and sets $v_{y1}''$ as a new value $v_{y1}'$ of the subject pixel $v_1$, moves on to the step S419 and outputs the Y data $v_{y1}''$ of the subject pixel $v_1$ to the RGB converting portion 42, and moves on to the steps S420 and S422.

The steps S420 and S422 are the processes simultaneously performed as the pipeline process in the post filter portion 40.

In the step S420, it calculates the judgment value $L_2$ of whether or not the absolute value of the difference between the value of the subject pixel $v_{x2}'$ and the value of the reference pixel $r_{y2}$ is exceeding the constant value $C_2$ by the following equation (42), and moves on to a step S424.

$$L_2 = (|v_{x2}' - r_{y2}| \leq C_2) \tag{42}$$

In the step S422, it calculates the value $v_{y2}''$ after the vertical filter operation as to the subject pixel $v_{x2}'$ by the above equations (29) to (36) according to the vertical position of the first subject pixel string $L_{SL}$ in the subject block 10, and moves on to the steps S424. In the step S422, it sets the value to be set as $v_{y2}'$ of the above equations (29) to (36) at $v_{y2}''$.

In the step S424, it judges whether or not the judgment value $L_2$ is "1," and if it judges that the judgment value $L_2$ is "1" (Yes), it moves on to the step S426 and sets $v_{y2}''$ as a new value $v_{y2}'$ of the subject pixel $v_2$, moves on to the step S427 and outputs the U data and V data of the subject pixels $v_2$ and $v_3$ to the RGB converting portion 42, and moves on to a step S428 to output the Y data $v_{y2}''$ of the subject pixel $v_2$ to the RGB converting portion 42, and then moves on to the steps S429 and S430.

The steps S429 and S430 are the processes simultaneously performed as the pipeline process in the post filter portion 40.

In the step S429, it calculates the judgment value $L_3$ of whether or not the absolute value of the difference between the value of the subject pixel $v_{x3}'$ and the value of the reference pixel $r_{y3}$ is exceeding the constant value $C_2$ by the following equation (43), and moves on to a step S432.

$$L_3 = (|v_{x3}' - r_{y3}| \leq C_2) \tag{43}$$

In the step S430, it calculates the value $v_{y3}''$ after the vertical filter operation as to the subject pixel $v_{x3}'$ by the above equations (29) to (36) according to the vertical position of the first subject pixel string $L_{SL}$ in the subject block 10, and moves on to the steps S432. In the step S430, it sets the value to be set as $v_{y3}'$ of the above equations (29) to (36) at $v_{y3}''$.

In the step S432, it judges whether or not the judgment value $L_3$ is "1," and if it judges that the judgment value $L_3$ is "1" (Yes), it moves on to a step S434 and sets $v_{y3}''$ as a new value $v_{y3}'$ of the subject pixel $v_3$, moves on to a step S446 and outputs the Y data $v_{y3}''$ of the subject pixel $V_3$ to the RGB converting portion 42 so as to finish the series of processes and have the original process returned.

On the other hand, in the step S432, in the case where it judges that the judgment values $L_3$ is "0" (No), it moves on to a step S448, and sets $v_{x3}'$ as a new value $v_{y3}'$ of the subject pixel $v_3$, and moves on to a step S446.

On the other hand, in the step S424, in the case where it judges that the judgment value $L_2$ is "0" (No), it moves on to a step S450, and sets $v_{x2}'$ as a new value $v_{y2}'$ of the subject pixel $v_2$, and moves on to the step S427.

On the other hand, in the step S416, in the case where it judges that the judgment value $L_1$ is "0" (No), it moves on to a step S452, and sets $v_{x1}'$ as a new value $v_{y1}'$ of the subject pixel $v_1$, and moves on to the step S419.

On the other hand, in the step S408, in the case where it judges that the judgment value $L_0$ is "0" (No), it moves on to a step S454, and sets $v_{x0}'$ as a new value $v_{y0}'$ of the subject pixel $v_0$, and moves on to the step S411.

Figure 9:
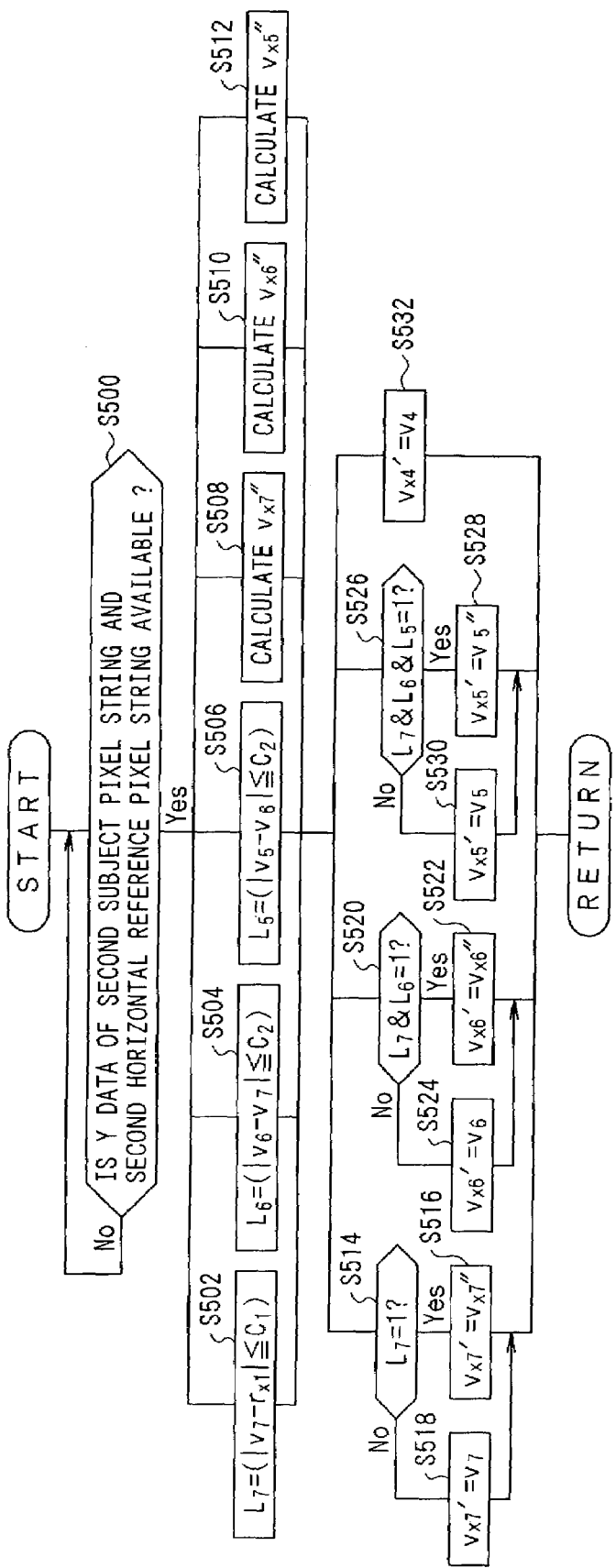
FIG. 9 is a flowchart showing a second horizontal filtering process.

Next, the second horizontal filtering process will be described in detail by referring to FIG. 9. FIG. 9 is a flowchart showing the second horizontal filtering process.

The second horizontal filtering process is the process of performing the horizontal filter operation as to the subject pixels $v_4$ to $v_7$ of the second subject pixel string $L_{SR}$, and if performed in the post filter portion 40, it first moves on to a step S500 as shown in FIG. 9.

In the step S500, it judges, by the pixel data reading process, whether or not the Y data of the subject pixels $v_4$ to $v_7$ of the second subject pixel string $L_{SR}$ and the reference pixel $r_{x1}$ of the second horizontal reference pixel string $L_{XR}$ has become available in the buffer, and if it judges that the pixel data has become available by reading or copying (Yes), it moves on to step S502 to S512, but if it judges otherwise (No), it waits in the step S500 until the pixel data becomes available.

The steps S502 to S512 are the processes simultaneously performed as the pipeline process in the post filter portion 40.

In the step S502, it calculates the judgment value $L_7$ of whether or not the absolute value of the difference between the value of the subject pixel $v_7$ and the value of the reference pixel $r_{x1}$ is exceeding the constant value $C_1$ by the following equation (44), and moves on to the steps S514, S520, S526 and S532.

$$L_7 = (|v_7 - r_{x1}| \leq C_1) \tag{44}$$

In the step S504, it calculates the judgment value $L_6$ of whether or not the absolute value of the difference between the value of the subject pixel $v_6$ and the value of the subject pixel $V_7$ is exceeding the constant value $C_2$ by the following equation (45), and moves on to the steps S514, S520, S526 and S532.

$$L_6 = (|v_6 - v_7| \leq C_2) \tag{45}$$

In the step S506, it calculates the judgment value $L_5$ of whether or not the absolute value of the difference between the value of the subject pixel $v_5$ and the value of the subject pixel $v_6$ is exceeding the constant value $C_2$ by the following equation (46), and moves on to the steps S514, S520, S526 and S532.

$$L_5 = (|v_5 - v_6| \leq C_2) \tag{46}$$

In the step S508, it calculates the value $v_{x7}''$ after the horizontal filter operation as to the subject pixel $v_7$ by the above equation (8), and moves on to the steps S514, S520, S526 and S532. In the step S508, it sets the value to be set as $v_{x7}'$ of the above equation (8) at $v_{x7}''$.

In the step S510, it calculates the value $v_{x6}''$ after the horizontal filter operation as to the subject pixel $v_6$ by the above equation (7), and moves on to the steps S514, S520, S526 and S532. In the step S510, it sets the value to be set as $v_{x6}'$ of the above equation (7) at $v_{x6}''$.

In the step S512, it calculates the value $v_{x5}''$ after the horizontal filter operation as to the subject pixel $v_5$ by the above equation (6), and moves on to the steps S514, S520, S526 and S532. In the step S512, it sets the value to be set as $v_{x5}'$ of the above equation (6) at $v_{x5}''$.

The steps S514, S520, S526 and S532 are the processes simultaneously performed as the pipeline process in the post filter portion 40.

In the step S514, it judges whether or not the judgment value $L_7$ is "1," and if it judges that the judgment value $L_7$ is "1" (Yes), it moves on to the step S516 and sets $v_{x7}''$ as a new value $v_{x7}'$ of the subject pixel $v_7$ so as to finish the series of processes and have the original process returned.

In the step S520, it judges whether or not the AND of the judgment values $L_7$ and $L_6$ is "1," and if it judges that the AND thereof is "1" (Yes), it moves on to the step S522 and sets $v_{x6}''$ as a new value $v_{x6}'$ of the subject pixel $v_6$ so as to finish the series of processes and have the original process returned.

In the step S526, it judges whether or not the AND of the judgment values $L_7$ to $L_5$ is "1," and if it judges that the AND thereof is "1" (Yes), it moves on to the step S528 and sets $v_{x5}''$ as a new value $v_{x5}'$ of the subject pixel $v_5$ so as to finish the series of processes and have the original process returned.

In the step S532, it sets $v_4$ as a new value $v_{x4}'$ of the subject pixel $v_4$ so as to finish the series of processes and have the original process returned.

On the other hand, in the step S514, in the case where it judges that the judgment value $L_7$ is "0" (No), it moves on to the step S518 and sets $v_7$ as a new value $v_{x7}'$ of the subject pixel $v_7$ so as to finish the series of processes and have the original process returned.

On the other hand, in the step S520, in the case where it judges that the AND of the judgment values $L_7$ and $L_6$ is "0" (No), it moves on to the step S524, and sets v6 as a new value $v_{x6}'$ of the subject pixel $v_6$ so as to finish the series of processes and have the original process returned.

On the other hand, in the step S526, in the case where it judges that the AND of the judgment values $L_7$ to $L_5$ is "0" (No), it moves on to the step S530, and sets $v_5$ as a new value $v_{x5}'$ of the subject pixel $v_5$ so as to finish the series of processes and have the original process returned.

Figure 10:
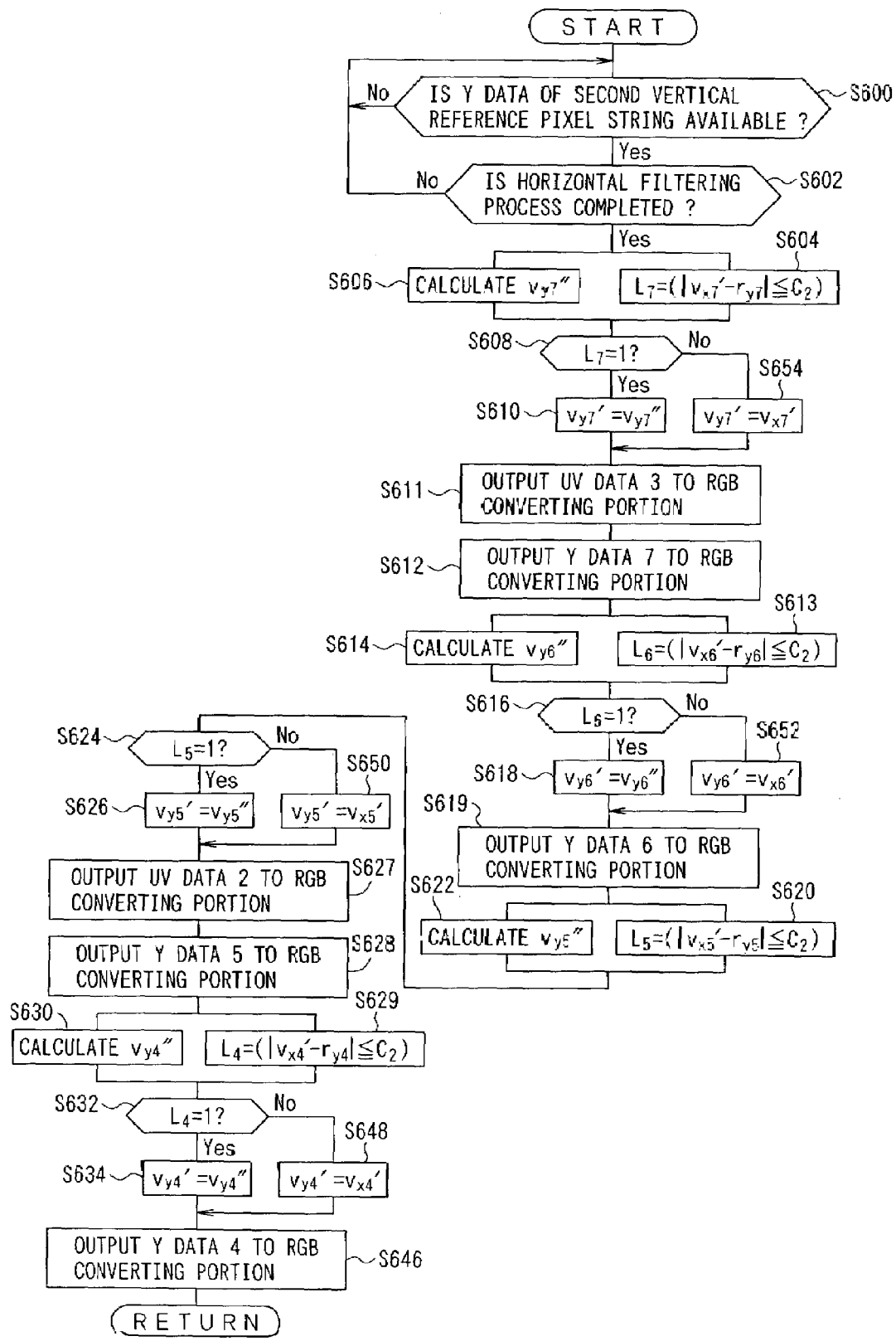
FIG. 10 is a flowchart showing a second vertical filtering process.

Next, the second vertical filtering process will be described in detail by referring to FIG. 10. FIG. 10 is a flowchart showing the second vertical filtering process.

The second vertical filtering process is the process of performing the vertical filter operation as to the subject pixels $v_4$ to $v_7$ of the second subject pixel string $L_{SR}$, and if performed in the post filter portion 40, it first moves on to a step S600 as shown in FIG. 10.

In the step S600, it judges, by the pixel data reading process, whether or not the Y data of the reference pixels $r_{y4}$ to $r_{y7}$ of the second vertical reference pixel string $L_{YR}$ has become available in the buffer, and if it judges that the pixel data has become available by reading or copying (Yes), it moves on to a step S602, but if it judges otherwise (No), it waits in the step S600 until the pixel data becomes available.

In the step S602, it judges, by the second horizontal filtering process, whether or not the horizontal filter processing has been completed as to the subject pixels $v_4$ to $v_7$ of the second subject pixel string $L_{SR}$, and if it judges that the filter processing has been completed (Yes), it moves on to the steps S604 and S606, but if it judges otherwise (No), it moves on to the step S600.

The steps S604 and S606 are the processes simultaneously performed as the pipeline process in the post filter portion 40.

In the step S604, it calculates the judgment value $L_7$ of whether or not the absolute value of the difference between the value of the subject pixel $v_{x7}'$ and the value of the reference pixel $r_{y7}$ is exceeding a constant value $C_2$ by the following equation (47), and moves onto a step S608. While the constant value $C_2$ is used here, the constant value $C_1$ is used instead in the case where the second subject pixel string $L_{SR}$ is positioned in the highest step or in the lowest step in the subject block 10. Hereafter, it is the same in the steps S613, S620 and S629.

$$L_7 = (|v_{x7}' - r_{y7}| \leq C_2) \tag{47}$$

In the step S606, it calculates the value $v_{y7}''$ after the vertical filter operation as to the subject pixel $v_{x7}'$ by the above equations (29) to (36) according to the vertical position of the second subject pixel string $L_{SR}$ in the subject block 10, and moves on to the step S608. In the step S606, it sets the value to be set as $v_{y7}'$ of the above equations (29) to (36) at $v_{y7}''$.

In the step S608, it judges whether or not the judgment value $L_7$ is "1," and if it judges that the judgment value $L_7$ is "1" (Yes), it moves on to the step S610 and sets $v_{y7}''$ as a new value $v_{y7}'$ of the subject pixel $v_7$, moves on to the step S611 and outputs the U data and V data of the subject pixels $v_7$ and $v_6$ to the RGB converting portion 42, and moves on to a step S612 to output the Y data $v_{y7}''$ of the subject pixel $v_7$ to the RGB converting portion 42, and then moves on to the steps S613 and S614.

The steps S613 and S614 are the processes simultaneously performed as the pipeline process in the post filter portion 40.

In the step S613, it calculates the judgment value $L_6$ of whether or not the absolute value of the difference between the value of the subject pixel $v_{x6}'$ and the value of the reference pixel $r_{y6}$ is exceeding the constant value $C_2$ by the following equation (48), and moves on to a step S616.

$$L_6 = (|v_{x6}' - r_{y6}| \leq C_2) \tag{48}$$

In the step S614, it calculates the value $v_{y6}''$ after the vertical filter operation as to the subject pixel $v_{x6}'$ by the above equations (29) to (36) according to the vertical position of the second subject pixel string $L_{SR}$ in the subject block 10, and moves on to the steps S616. In the step S614, it sets the value to be set as $v_{y6}'$ of the above equations (29) to (36) at $v_{y6}''$.

In the step S616, it judges whether or not the judgment value $L_6$ is "1," and if it judges that the judgment value $L_6$ is "1" (Yes), it moves on to the step S618 and sets $v_{y6}''$ as a new value $v_{y6}'$ of the subject pixel $v_6$, moves on to the step S619 and outputs the Y data $v_{y6}''$ of the subject pixel $v_6$ to the RGB converting portion 42, and moves on to the steps S620 and S622.

The steps S620 and S622 are the processes simultaneously performed as the pipeline process in the post filter portion 40.

In the step S620, it calculates the judgment value $L_5$ of whether or not the absolute value of the difference between the value of the subject pixel $v_{x5}'$ and the value of the reference pixel $r_{y5}$ is exceeding the constant value $C_2$ by the following equation (49), and moves on to a step S624.

$$L_5 = (|v_{x5}' - r_{y5}| \leq C_2) \tag{49}$$

In the step S622, it calculates the value $v_{y5}''$ after the vertical filter operation as to the subject pixel $v_{x5}'$ by the above equations (29) to (36) according to the vertical position of the second subject pixel string $L_{SR}$ in the subject block 10, and moves on to the step S624. In the step S622, it sets the value to be set as $v_{y5}'$ of the above equations (29) to (36) at $v_{y5}''$.

In the step S624, it judges whether or not the judgment value $L_5$ is "1," and if it judges that the judgment value $L_5$ is "1" (Yes), it moves on to the step S626 and sets $v_{y5}''$ as a new value $v_{y5}'$ of the subject pixel $v_5$, moves on to the step S627 and outputs the U data and V data of the subject pixels $v_5$ and $v_4$ to the RGB converting portion 42, and moves on to a step S628 to output the Y data $v_{y5}''$ of the subject pixel $v_5$ to the RGB converting portion 42, and then moves on to the steps S629 and S630.

The steps S629 and S630 are the processes simultaneously performed as the pipeline process in the post filter portion 40.

In the step S629, it calculates the judgment value $L_4$ of whether or not the absolute value of the difference between the value of the subject pixel $v_{x4}'$ and the value of the reference pixel $r_{y4}$ is exceeding the constant value $C_2$ by the following equation (50), and moves on to a step S632.

$$L_4 = (|v_{x4}' - r_{y4}| \leq C_2) \tag{50}$$

In the step S630, it calculates the value $v_{y4}''$ after the vertical filter operation as to the subject pixel $v_{x4}'$ by the above equations (29) to (36) according to the vertical position of the second subject pixel string $L_{SR}$ in the subject block 10, and moves on to the steps S632. In the step S630, it sets the value to be set as $v_{y4}'$ of the above equations (29) to (36) at $v_{y4}''$.

In the step S632, it judges whether or not the judgment value $L_4$ is "1," and if it judges that the judgment value $L_4$ is "1" (Yes), it moves on to a step S634 and sets $v_{y4}''$ as a new value $v_{y4}'$ of the subject pixel $v_4$, moves on to a step S646 and outputs the Y data $v_{y4}''$ of the subject pixel $v_4$ to the RGB converting portion 42 so as to finish the series of processes and have the original process returned.

On the other hand, in the step S632, in the case where it judges that the judgment values $L_4$ is "0" (No), it moves on to a step S648, and sets $v_{x4}'$ as a new value $v_{y4}'$ of the subject pixel $v_4$, and moves on to a step S646.

On the other hand, in the step S624, in the case where it judges that the judgment value $L_5$ is "0" (No), it moves on to a step S650, and sets $v_{x5}'$ as a new value $v_{y5}'$ of the subject pixel $v_5$, and moves on to the step S627.

On the other hand, in the step S616, in the case where it judges that the judgment value $L_6$ is "0" (No), it moves on to a step S652, and sets $v_{x6}'$ as a new value $v_{y6}'$ of the subject pixel $v_6$, and moves on to the step S619.

On the other hand, in the step S608, in the case where it judges that the judgment value $L_7$ is "0" (No), it moves on to a step S654, and sets $v_{x7}'$ as a new value $v_{y7}'$ of the subject pixel $v_7$, and moves on to the step S611.

Figure 11:
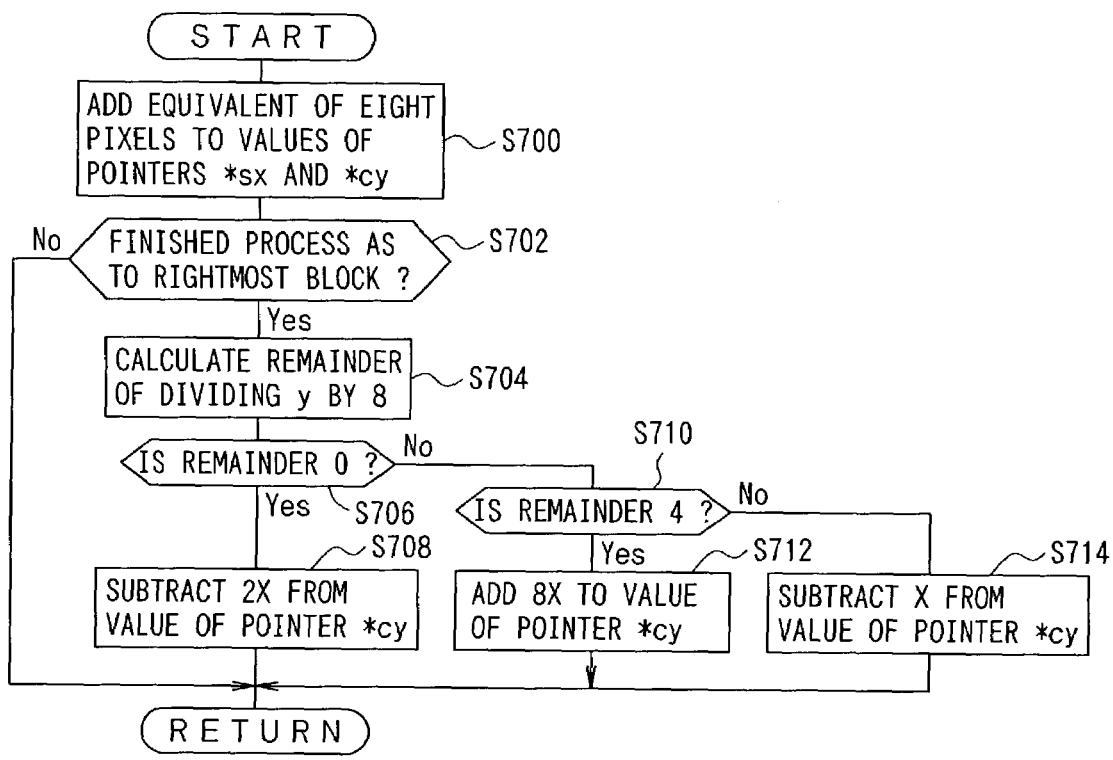
FIG. 11 is a flowchart showing a pointer updating process.

Next, the pointer updating process of the above step S106 will be described in detail by referring to FIG. 11. FIG. 11 is a flowchart showing the pointer updating process.

If performed in the above step S106, the pointer updating process first moves on to the step S700 as shown in FIG. 11. Moreover, in the following steps, the number of horizontal pixels of the reproduced image is X, and the vertical coordinate of first subject pixel string $L_{SL}$ and second subject pixel string $L_{SR}$ in the subject block 10 is y.

In the step S700, it adds an equivalent of eight pixels to the values of the pointer for the subject pixel *sx and the pointer for the vertical reference pixel *cy. This addition moves the subject block 10 and the pointer for the vertical reference pixel *cy to the right by one block. In the case where the subject block 10 before the addition is the rightmost block in the reproduced image, however, they move to the leftmost block lower by one step. As this move only adds a predetermined number, it can be implemented just by an adder in case of constituting it by the hardware.

In the step S702, it judges whether or not the filtering process has been finished as to the subject pixels of the rightmost block in the reproduced image, and if it judges that the filtering process has been finished (Yes), it moves on to the step S704, but if it judges otherwise (No), it finishes the series of processes and has the original process returned.

In the step S704, it calculates the remainder of dividing y by "8," moves on to the step S706 and judges whether or not the calculated remainder is "0," and if it judges that the remainder is "0" (Yes), it moves onto the step S708 and subtracts 2X from the pointer for the vertical reference pixel *cy so as to finish the series of processes and have the original process returned. This subtraction moves the pointer for the vertical reference pixel *cy to the lowest step of the vertical reference block 16 adjacent to it above the subject block 10. As this move only doubles X and subtracts it, it can be implemented just by the shifter and adder in case of constituting it by the hardware.

On the other hand, in the step S706, in the case where it judges that the calculated remainder is not "0" (No), it moves on to a step S710 and judges whether or not the calculated remainder is "4," and if it judges that the remainder is "4" (Yes), it moves on to the step S712 and adds 8X to the value of the pointer for the vertical reference pixel *cy so as to finish the series of processes and have the original process returned. This addition moves the pointer for the vertical reference pixel *cy to the highest step of the vertical reference block 18 adjacent to it below the subject block 10. As this move only multiplies X by 8 and adds it, it can be implemented just by the shifter and adder in case of constituting it by the hardware.

On the other hand, in the step S710, in the case where it judges that the calculated remainder is not "4" (No), it moves on to a step S714, and subtracts X from the pointer for the vertical reference pixel *cy so as to finish the series of processes and have the original process returned. This subtraction moves the pointer for the vertical reference pixel *cy to the lowest step of the vertical reference block 16 adjacent to it above the subject block 10. As this move only subtracts X, it can be implemented just by the adder in case of constituting it by the hardware.

Figure 12:
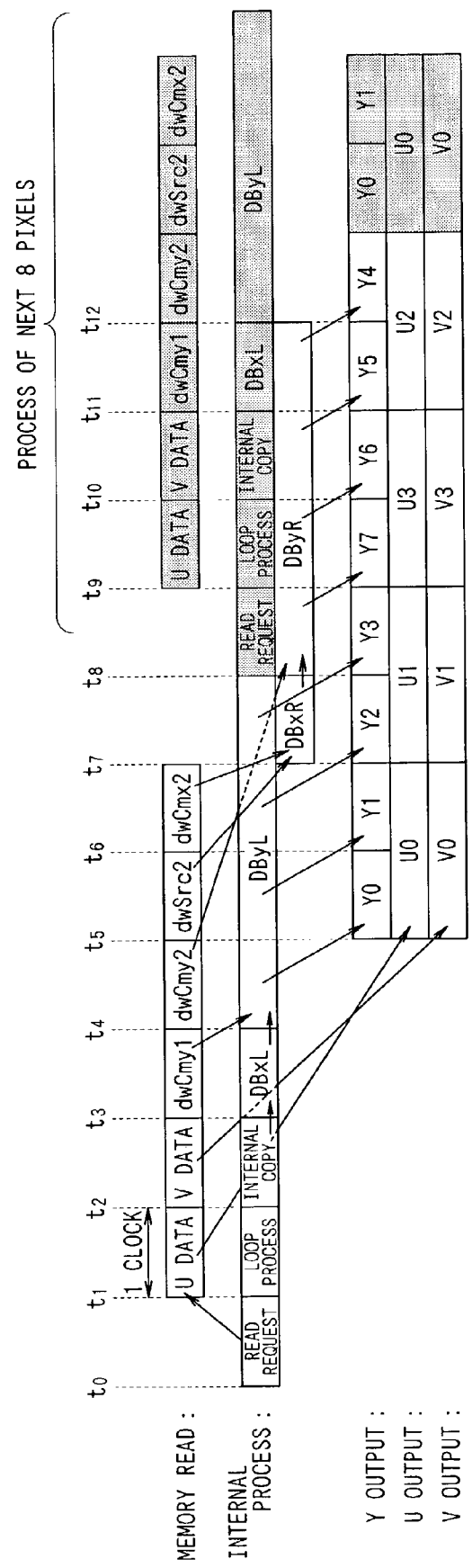
FIG. 12 is a time chart showing a process of performing the deblock filtering process.

Next, operation of this embodiment will be described by referring to the drawings. FIG. 12 is a time chart showing the process of performing the deblock filtering process. Hereafter, each of times $t_0$ to $t_{12}$ indicates the time when a predetermined time T equivalent to 1 clock of the post filter portion 40 elapsed each time. To be more specific, each of the times $t_0$ to $t_{12}$ indicates the time when the predetermined time T elapsed from the time immediately preceding it.

First, at the time $t_0$, through the step S100, the post filter portion 40 sets as the pointer for the subject pixel *sx the address at which the pixel data of the leftmost pixel of the first subject pixel string $L_{SL}$ to be processed first in the VRAM 35 is stored, and sets as the pointer for the vertical reference pixel *cy the address at which the pixel data of the leftmost pixel of the first vertical reference pixel string $L_{YL}$ to be processed first in the VRAM 35 is stored respectively. And, through the step S102, it refers to the pointer for the subject pixel *sx and the pointer for the vertical reference pixel *cy, and outputs the read request to read the first subject pixel string $L_{SL}$, second subject pixel string $L_{SR}$, second horizontal reference pixel string $L_{XR}$, first vertical reference pixel string $L_{YL}$ and second vertical reference pixel string $L_{YR}$.

If the read request is outputted, at the time $t_1$, through the steps S202 and S204, the U data of the subject pixels $v_0$ and $v_1$, the U data of the subject pixels $v_2$ and $v_3$, the U data of the subject pixels $v_4$ and $v_5$ and the U data of the subject pixels $v_6$ and $v_7$ are read to the VRAM 35.

Subsequently, at the time $t_2$, through the steps S206 and S208, the V data of the subject pixels $v_0$ and $v_1$, the V data of the subject pixels $v_2$ and $v_3$, the V data of the subject pixels $v_4$ and $v_5$ and the V data of the subject pixels $v_6$ and $v_7$ are read to the VRAM 35.

Figure 13:
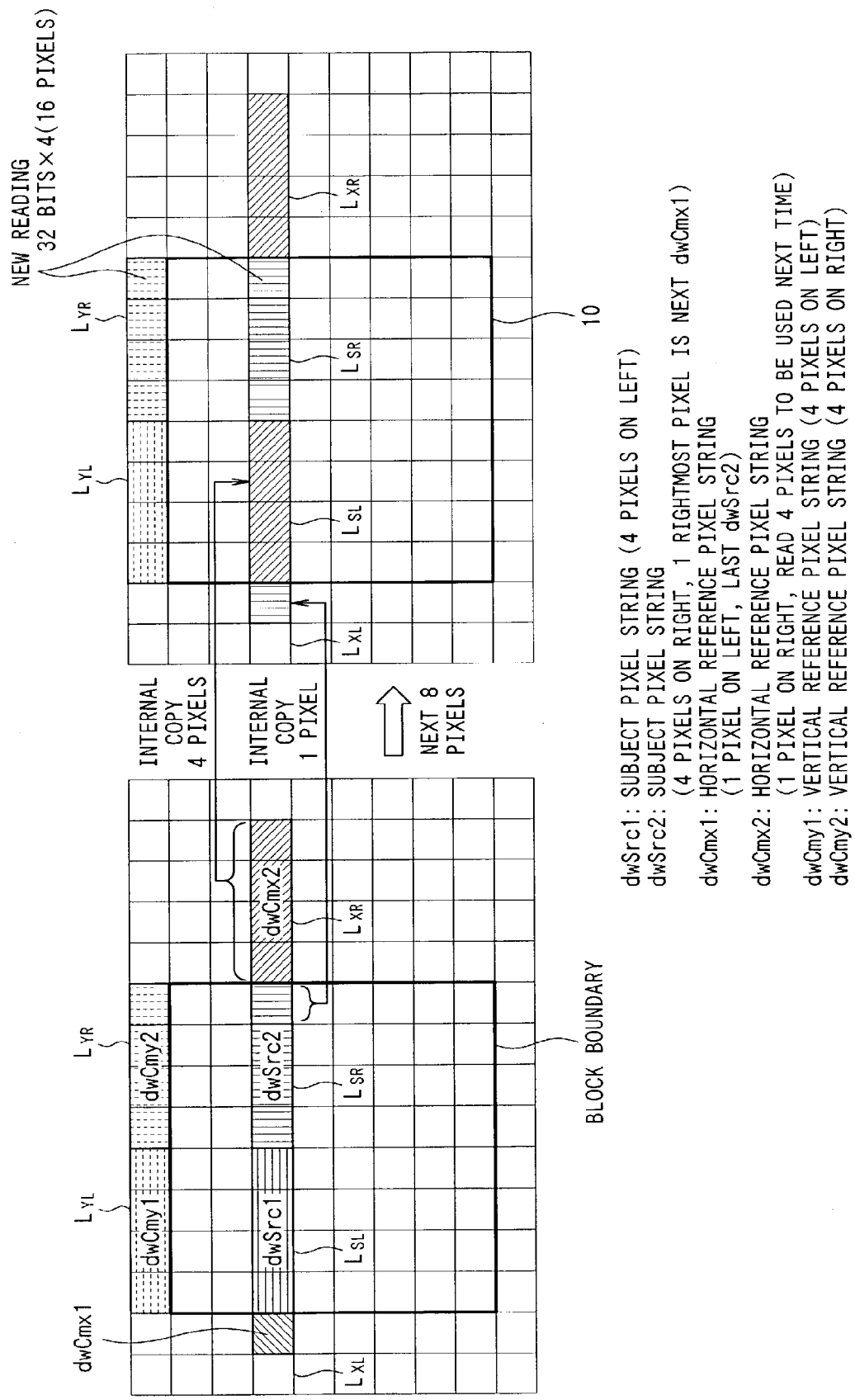
FIG. 13 is a diagram for explaining the case of copying and reutilizing pixel data.
Figure 14:
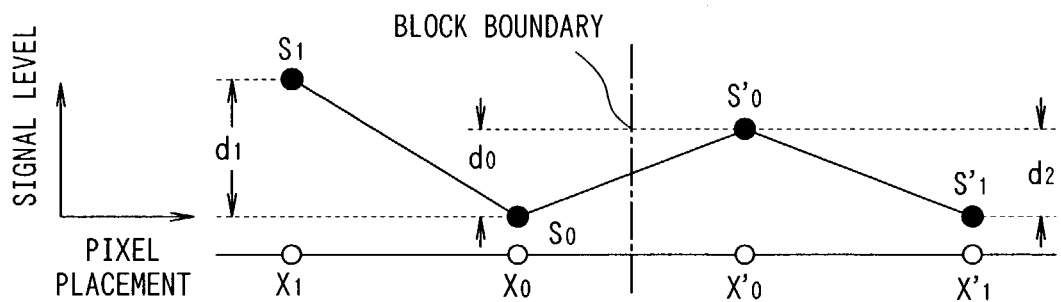
FIG. 14 is a diagram showing a filtering process by an image processing system in the past.
Figure 15:
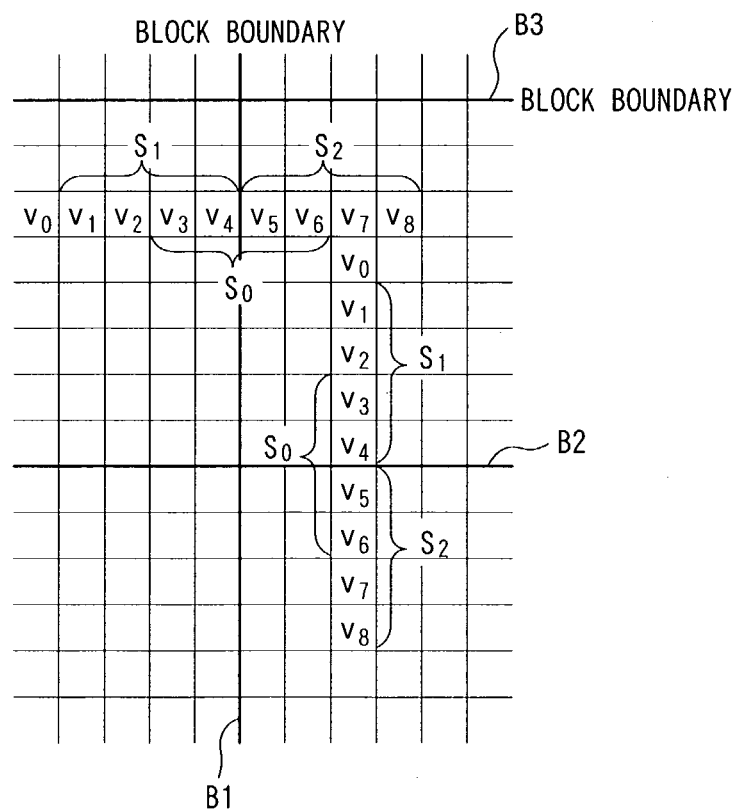
FIG. 15 is a diagram showing pixels referred to by the image processing system in the past.

On the other hand, at the same time $t_2$, through the steps S222 and S224, it copies in the buffer the pixel data of the second horizontal reference pixel string $L_{XR}$ read last time as the pixel data of the subject pixels $v_0$ to $v_3$ of the first subject pixel string $L_{SL}$, and copies in the buffer the data related to the rightmost pixel of the pixel data of the second subject pixel string $L_{SR}$ read last time as the pixel data of the reference pixel $r_{x0}$ of the first horizontal reference pixel string $L_{XL}$ as shown in FIG. 13. FIG. 13 is a diagram for explaining the case of copying and reutilizing the pixel data.

Subsequently, at the time $t_3$, through the step S214, it refers to the pointer for the vertical reference pixel *cy, and the Y data of the pixel data of the subject pixels $r_{y0}$ to $r_{y3}$ of the first vertical reference pixel string $L_{YL}$ is read to the VRAM 35.

On the other hand, at the same time $t_3$, the Y data of the subject pixels $v_0$ to $v_3$ of the first subject pixel string $L_{SL}$ and the reference pixel $r_{x0}$ of the first horizontal reference pixel string $L_{XL}$ has become available in the buffer, and so the judgment values $L_0$ to $L_2$ are calculated by the above equations (37) to (39) and $v_{x0}''$ to $v_{x2}''$ are calculated by the above equations (1) to (3) through the steps S302 to S312. At this time, if the judgment values $L_0$ is "1," it sets $v_{x0}''$ as a new value $v_{x0}'$ of the subject pixel $v_0$ through the steps S316, and if the judgment values $L_0$ is "0," it sets $v_0$ as a new value $v_{x0}'$ of the subject pixel $v_0$ through the steps S318. In addition, if the AND of the judgment values $L_0$ and $L_1$ is "1," it sets $v_{x1}''$ as a new value $v_{x1}'$ of the subject pixel $v_1$ through the steps S322, and if the AND is "0," it sets $v_1$ as a new value $v_{x1}'$ of the subject pixel $v_1$ through the steps S324. Moreover, if the AND of the judgment values $L_0$ to $L_2$ is "1," it sets $v_{x2}''$ as a new value $v_{x2}'$ of the subject pixel $v_2$ through the steps S328, and if the AND is "0" it sets $v_2$ as a new value $v_{x2}'$ of the subject pixel $v_2$ through the steps S330. In addition, it sets $v_3$ as a new value $v_{x3}'$ of the subject pixel $v_3$ through the steps S332.

Subsequently, at the time $t_4$, through the step S216, it refers to the pointer for the vertical reference pixel *cy, and the Y data of the pixel data of the reference pixels $r_{y4}$ to $r_{y7}$ of the second vertical reference pixel string $L_{YR}$ is read to the VRAM 35.

On the other hand, at the same time $t_4$, the Y data of the reference pixels $r_{y0}$ to $r_{y3}$ of the first vertical reference pixel string $L_{YL}$ has become available in the buffer and the horizontal filtering process has been completed as to the subject pixels $v_0$ to $v_3$ of the first subject pixel string $L_{SL}$, and so the judgment value $L_0$ is calculated by the above equation (40) through the steps S404 and S406, and $v_{y0}''$ is calculated by one of the above equations (29) to (36). At this time, if the judgment values $L_0$ is "1," it sets $v_{y0}''$ as a new value $v_{y0}'$ of the subject pixel $v_0$ through the steps S410, and if the judgment values $L_0$ is "0," it sets $v_{x0}$ as a new value $v_{y0}'$ of the subject pixel $v_0$ through the step S454. And, through the steps S411 and 412, it outputs the U data and V data of the subject pixels $v_0$ and $v_1$ to the RGB converting portion 42, and outputs the Y data $v_{y0}''$ of the subject pixel $v_0$ to the RGB converting portion 42. The deblock filtering process as to the subject pixel $v_0$ is thereby completed.

Subsequently, at the time $t_5$, through the step S218, it refers to the pointer for the subject pixel *sx, and the Y data of the pixel data of the subject pixels $v_4$ to $v_7$ of the second subject pixel string $L_{SR}$ is read to the VRAM 35.

On the other hand, at the same time $t_5$, through the steps S413 and S414, the judgment value $L_1$ is calculated by the above equation (41), and $v_{y1}''$ is calculated by one of the above equations (29) to (36). At this time, if the judgment values $L_1$ is "1," it sets $v_{y1}''$ as a new value $v_{y1}'$ of the subject pixel $v_1$ through the step S418, and if the judgment values $L_1$ is "0," it sets $v_{x1}$ as a new value $v_{y1}'$ of the subject pixel $v_1$ through the step S452. And, through the steps S419, it outputs the Y data $v_{y1}''$ of the subject pixels $v_1$ to the RGB converting portion 42. The deblock filtering process as to the subject pixel $v_1$ is thereby completed.

Subsequently, at the time $t_6$, through the step S220, it refers to the pointer for the subject pixel *sx, and the Y data of the pixel data of the subject pixels (including the reference pixel $r_{x1}$) of the second horizontal reference pixel string $L_{XR}$ is read to the VRAM 35.

On the other hand, at the same time $t_6$, the judgment value $L_2$ is calculated by the above equation (42) through the steps S420 and S422, and $v_{y2}''$ is calculated by one of the above equations (29) to (36). At this time, if the judgment values $L_2$ is "1," it sets $v_{y2}''$ as a new value $v_{y2}'$ of the subject pixel $v_2$ through the step S426, and if the judgment values $L_2$ is "0," it sets $v_{x2}'$ as a new value $v_{y2}'$ of the subject pixel $v_2$ through the step S450. And, through the steps S427 and S428, it outputs the U data and V data of the subject pixels $v_2$ and $v_3$ to the RGB converting portion 42, and outputs the Y data $v_{y2}''$ of the subject pixel $v_2$ to the RGB converting portion 42. The deblock filtering process as to the subject pixel $v_2$ is thereby completed.

Subsequently, at the time $t_7$, the judgment value $L_3$ is calculated by the above equation (43) through the steps S429 and S430, and $v_{y3}''$ is calculated by one of the above equations (29) to (36). At this time, if the judgment value $L_3$ is "1," it sets $v_{y3}''$ as a new value $v_{y3}'$ of the subject pixel $v_3$ through the step S434, and if the judgment value $L_3$ is "0," it sets $v_{x3}'$ as a new value $v_{y3}'$ of the subject pixel $v_3$ through the step S448. And, through the step S446, it outputs the Y data $v_{y3}''$ of the subject pixels $v_3$ to the RGB converting portion 42. The deblock filtering process as to the subject pixel $v_3$ is thereby completed.

On the other hand, at the same time $t_7$, the Y data of the subject pixels $v_4$ to $v_7$ of the second subject pixel string $L_{SR}$ and the reference pixel $r_{x1}$ of the second horizontal reference pixel string $L_{XR}$ has become available in the buffer, and so the judgment values $L_7$ to $L_5$ are calculated by the above equations (44) to (46) and $v_{x7}''$ to $v_{x5}''$ are calculated by the above equations (8) to (6) through the steps S502 to S512. At this time, if the judgment values $L_7$ is "1," it sets $v_{x7}''$ as a new value $v_{x7}'$ of the subject pixel $v_7$ through the step S516, and if the judgment values $L_7$ is "0," it sets $v_7$ as a new value $v_{x7}'$ of the subject pixel $v_7$ through the step S518. In addition, if the AND of the judgment values $L_7$ and $L_6$ is "1," it sets $v_{x6}''$ as a new value $v_{x6}'$ of the subject pixel $v_6$ through the step S522, and if the AND is "0," it sets $v_6$ as a new value $v_{x6}'$ of the subject pixel $v_6$ through the step S524. Moreover, if the AND of the judgment values $L_7$ to $L_5$ is "1," it sets $v_{x5}'$ as a new value $v_{x5}'$ of the subject pixel $v_5$ through the step S528, and if the AND is "0," it sets $v_5$ as a new value $v_{x5}'$ of the subject pixel $v_5$ through the step S530. In addition, it sets $v_4$ as a new value $v_{x4}'$ of the subject pixel $v_4$ through the step S532.

Subsequently, at the same time $t_8$, the Y data of the reference pixels $r_{y4}$ to $r_{y7}$ of the second vertical reference pixel string $L_{YR}$ has become available in the buffer and the horizontal filtering process has been completed as to the subject pixels $v_4$ to $v_7$ of the second subject pixel string $L_{SR}$, and so the judgment value $L_7$ is calculated by the above equation (47) through the steps S604 and S606, and $v_{y7}''$ is calculated by one of the above equations (29) to (36). At this time, if the judgment values $L_7$ is "1," it sets $v_{y7}''$ as a new value $v_{y7}'$ of the subject pixel $v_7$ through the step S610, and if the judgment value $L_7$ is "0," it sets $v_{x7}'$ as a new value $v_{y7}'$ of the subject pixel $v_7$ through the step S654. And, through the steps S611 and 612, it outputs the U data and V data of the subject pixels $v_7$ and $v_6$ to the RGB converting portion 42, and outputs the Y data $v_{y7}''$ of the subject pixel $v_7$ to the RGB converting portion 42. The deblock filtering process as to the subject pixel $v_7$ is thereby completed.

Moreover, at the same time $t_8$, through the steps S700 to S714, the pointer for the subject pixel *sx and the pointer for the vertical reference pixel *cy move to the block adjacent to the subject block 10 on the right thereof, and the same process as that of the time $t_0$ is performed to that block.

Next, at the same time $t_8$, through the steps S613 and S614, the judgment value $L_6$ is calculated by the above equation (48), and $v_{y6}''$ is calculated by one of the above equations (29) to (36). At this time, if the judgment value $L_6$ is "1," it sets $v_{y6}''$ as a new value $v_{y6}'$ of the subject pixel $v_6$ through the step S618, and if the judgment value $L_6$ is "0," it sets $v_{x6}'$ as a new value $v_{y6}'$ of the subject pixel $v_6$ through the step S652. And, through the step S619, it outputs the Y data $v_{y6}''$ of the subject pixel $v_6$ to the RGB converting portion 42. The deblock filtering process as to the subject pixel $v_6$ is thereby completed.

Moreover, at the same time $t_9$, the same process as that of the time $t_1$ is performed to the block adjacent to the subject block 10 on the right thereof.

Next, at the same time $t_{10}$, through the steps S620 and S622, the judgment value $L_5$ is calculated by the above equation (49), and $v_{y5}''$ is calculated by one of the above equations (29) to (36). At this time, if the judgment value $L_5$ is "1," it sets $v_{y5}''$ as a new value $v_{y5}'$ of the subject pixel $v_5$ through the step S626, and if the judgment value $L_5$ is "0," it sets $v_{x5}'$ as a new value $v_{y5}'$ of the subject pixel $v_5$ through the step S650. And, through the steps S627 and S628, it outputs the U data and V data of the subject pixel $v_5$ and $v_4$ to the RGB converting portion 42, and outputs the Y data $v_{y5}''$ of the subject pixel $v_5$ to the RGB converting portion 42. The deblock filtering process as to the subject pixel $v_5$ is thereby completed.

Moreover, at the same time $t_{10}$, the same process as that of the time $t_2$ is performed to the block adjacent to the subject block 10 on the right thereof.

Next, at the time $t_{11}$, through the steps S629 and S630, the judgment value $L_4$ is calculated by the above equation (50), and $v_{y4}''$ is calculated by one of the above equations (29) to (36). At this time, if the judgment value $L_4$ is "1," it sets $v_{y4}''$ as a new value $v_{y4}'$ of the subject pixel $v_4$ through the step S634, and if the judgment value $L_4$ is "0," it sets $v_{x4}'$ as a new value $v_{y4}'$ of the subject pixel $v_4$ through the step S648. And, through the step S646, it outputs the Y data $v_{y4}''$ of the subject pixel $v_4$ to the RGB converting portion 42. The deblock filtering process as to the subject pixel $v_4$ is thereby completed.

Moreover, at the same time $t_{11}$, the same process as that of the time $t_3$ is performed to the block adjacent to the subject block 10 on the right thereof.

Thus, according to this embodiment, the deblock filtering process judges whether or not the difference values between the values of the subject pixels $V_0$ to $v_7$ and the values of the reference pixels $r_{y0}$ to $r_{y7}$ are exceeding a threshold, and performs the horizontal filter operation as to the subject pixels $v_0$ to $v_7$ based solely on the values of the subject pixels $v_0$ to $v_7$ and the values of the reference pixels $r_{x0}$ and $r_{x1}$, determines whether or not to perform the vertical filter operation as to the subject pixels $v_0$ to $v_7$ based solely on the above judgment result, and performs the vertical filter operation as to the subject pixels $v_0$ to $v_7$ based solely on the values of the subject pixels $v_0$ to $v_7$ and the values of the reference pixels $r_{y0}$ to $_{y7}$.

Thus, in case of judging whether or not to perform the filter operation and performing the filter operation, it just has to refer to the subject pixels $v_0$ to $v_7$, the reference pixels $r_{x0}$ and $r_{x1}$ and the reference pixels $r_{y0}$ to $r_{y7}$ so that the deblock filtering process can be simplified compared to the cases in the past. For instance, in case of implementing the deblock filtering process by the hardware as in this embodiment, a circuit scale can be rendered smaller, and in case of implementing the deblock filtering process by software, a program size can be reduced. In particular, as the pixels positioned on the boundaries in the horizontal reference blocks 12 and 14 and the vertical reference blocks 16 and 18 are used as the reference pixel $r_{x0}$ and $r_{x1}$ and the reference pixels $r_{y0}$ to $r_{y7}$, the deblock filtering process can be simplified without reducing the filter effect significantly. Furthermore, the number of times of access to the VRAM 35 can be reduced so that the acceleration of processing can be expected.

Furthermore, according to this embodiment, the deblock filtering process tries the filter operation as to all the pixels of the reproduced image while repeating reading of the pixel data, the judgment and the filter operation as the series of processes, and as to the subject pixel belonging to the upper left area of the subject block 10, it uses the values of the reference pixels of the horizontal reference block 12 and the vertical reference block 16 adjacent to the subject block 10 on the left of and above it for the judgment and the filter operation, as to the subject pixel belonging to the upper right area of the subject block 10, it uses the values of the reference pixels of the horizontal reference block 14 and the vertical reference block 16 adjacent to the subject block 10 on the right of and above it for the judgment and the filter operation, as to the subject pixel belonging to the lower left area of the subject block 10, it uses the values of the reference pixels of the horizontal reference block 12 and the vertical reference block 18 adjacent to the subject block 10 on the left of and below it for the judgment and the filter operation, and as to the subject pixel belonging to the lower right area of the subject block 10, it uses the values of the reference pixels of the horizontal reference block 14 and the vertical reference block 18 adjacent to the subject block on the right of and below it for the judgment and the filter operation.

Thus, in case of performing the deblock filtering process to the four subject pixels $v_0$ to $v_3$, it only has to read nine pixels from the VRAM 35 so that the number of times of reading to the VRAM 35 can be reduced. In addition, in case of judging whether or not to perform the filter operation and performing the filter operation, comparatively adequate reference pixels are used according to the area which the subject pixels $v_0$ to $v_3$ belong to, and so the filter effect can be improved.

Furthermore, according to this embodiment, the deblock filtering process refers to the pointer for the vertical reference pixel *cy to read the pixel data to the buffer, and further adds an equivalent of eight pixels to the value of the pointer for the vertical reference pixel *cy in each series of the processes, subtracts 2X from the value of the pointer for the vertical reference pixel *cy when the subject block 10 be processed next is the leftmost block in the reproduced image and the remainder on dividing y by "8" is "0," adds 8X to the value of the pointer for the vertical reference pixel *cy when the subject block 10 to be processed next is the leftmost block in the reproduced image and the remainder on dividing y by "8" is "4," and subtracts X from the value of the pointer for the vertical reference pixel *cy when the subject block 10 to be processed next is the leftmost block in the reproduced image and the remainder on dividing y by "8" is a value other than "0" or "4."

Thus, updating of the pointer for the vertical reference pixel *cy can be implemented just by the shifter and the adder so that the load can be reduced and the configuration can be rendered comparatively simple.

Furthermore, according to this embodiment, as to each series of processes, the deblock filtering process reads the second subject pixel string $L_{SR}$, second horizontal reference pixel string $L_{XR}$, first vertical reference pixel string $L_{YL}$ and second vertical reference pixel string $L_{YR}$ to the buffer, and also reutilizes the pixel data of the second subject pixel string $L_{SR}$ and second horizontal reference pixel string $L_{XR}$ read in the immediately preceding process as the pixel data of the first horizontal reference pixel string $L_{XL}$ and first subject pixel string $L_{SL}$ respectively, so that the judgment and the filter operation are performed as to all the subject pixels $v_0$ to $v_7$ of the first subject pixel string $L_{SL}$ and second subject pixel string $L_{SR}$.

Thus, the number of times of reading to the VRAM 35 can further be reduced since it is not necessary to reread the pixel data of the first horizontal reference pixel string $L_{XL}$ and first subject pixel string $L_{SL}$ from VRAM 35.

Furthermore, according to this embodiment, in the case where a first phase is the process of copying the pixel data of the second subject pixel string $L_{SR}$ and second horizontal reference pixel string $L_{XR}$ read in the immediately preceding process as the pixel data of the first horizontal reference pixel string $L_{XL}$ and first subject pixel string $L_{SL}$ respectively, a second phase is the process of reading the pixel data of the first vertical reference pixel string $L_{YL}$ to the buffer, a third phase is the process of reading the pixel data of the second vertical reference pixel string $L_{YR}$ to the buffer, a fourth phase is the process of reading the pixel data of the second subject pixel string $L_{SR}$ into the buffer, a fifth phase is the process of reading the pixel data of the second horizontal reference pixel string $L_{XR}$ into the buffer, a sixth phase is the process of performing the horizontal filter operation as to each subject pixel of the first subject pixel string $L_{SL}$ based on the pixel data of the first horizontal reference pixel string $L_{XL}$, a seventh phase is the process of performing the judgment and the vertical filter operation as to each subject pixel of the first subject pixel string $L_{SL}$ based on processing results of the sixth phase and the pixel data of the first vertical reference pixel string $L_{YL}$, an eighth phase is the process of performing the horizontal filter operation as to each subject pixel of the second subject pixel string $L_{SR}$ based on the pixel data of the second horizontal reference pixel string $L_{XR}$, and a ninth phase is the process of performing the judgment and the vertical filter operation as to each subject pixel of the second subject pixel string $L_{SR}$ based on the processing results of the eighth phase and the pixel data of the second vertical reference pixel string $L_{YR}$, the series of processes performs the first phase, the second phase, the third phase, the fourth phase and the fifth phase in that order, performs the sixth phase and the seventh phase in that order, performs the fifth phase, and the eighth phase and the ninth phase in that order, and also starts performing the second phase and the sixth phase at the same time and performing the third phase and the seventh phase at the same time.

Thus, an efficient pipeline process can be implemented when judging whether or not to perform the filter operation and performing the filter operation, and so the acceleration of processing can be expected. In addition, the pixel data is read in order of the first vertical reference pixel string $L_{YL}$, second vertical reference pixel string $L_{YR}$, second subject pixel string $L_{SR}$ and second horizontal reference pixel string $L_{XR}$ so that the reading of the pixel data of the first vertical reference pixel string $L_{YL}$ and second vertical reference pixel string $L_{YR}$ and the reading of the pixel data of the second subject pixel string $L_{SR}$ and second horizontal reference pixel string $L_{XR}$ can be successively performed, allowing the reading process of the pixel data to be simplified.

Furthermore, according to this embodiment, the deblock filtering process calculates the values of the pixels after the deblock filtering $v_0'$ to $v_2'$ and $v_5'$ to $v_7'$ by the filter operation equations of the above equations (1) to (3) and (6) to (8) as to the pixel strings orthogonal to the boundary between mutually adjacent blocks.

It is thereby possible, when performing the filter operation as to one pixel, to further simplify the deblock filtering process because only two pixel values are used instead of using an average of a large number of pixels. In addition, it is possible to implement the effective filter effect in addition to further simplifying the deblock filtering process because the computing is performed by the addition and subtraction and bit shift (a division wherein a divisor is an integral multiple of 2) using one pixel value and the value of the pixel of the same pixel string which is the reference pixel in the adjacent block.

Furthermore, according to this embodiment, the deblock filtering process performs the filter operation as to one pixel of the pixels of the pixel string orthogonal to the boundary between mutually adjacent blocks when no mutual difference value of the pixels between that one pixel and the pixel of the same pixel string which is the reference pixel positioned on the boundary in the adjacent block is exceeding thresholds $C_1$ and $C_2$, where constant values are used as the thresholds $C_1$ and $C_2$.

Thus, as the thresholds $C_1$ and $C_2$ are the constant values, it is not necessary to calculate $C_1$ and $C_2$ in the course of the deblock filtering process, and no filter operation is performed if any of the mutual difference values of the pixels is exceeding the thresholds $C_1$ and $C_2$. Therefore, it is possible to render the deblock filtering process relatively higher-speed compared to the past in addition to further simplifying it.

Furthermore, according to this embodiment, the threshold $C_1$ for comparing the difference values between the reference pixels and the adjacent pixels adjacent thereto is set to be larger than the threshold $C_2$ for comparing the difference values between the reference pixels and the pixels other than the adjacent pixels.

Thus, a further effective filter effect can be implemented because the deblock filtering process having considered the characteristic that the average of luminance is different among the blocks can be performed.

Furthermore, according to this embodiment, the threshold $C_1$ for comparing the difference values between the reference pixels and the adjacent pixels adjacent thereto is set at "32" assuming the maximum value of the pixels as "255," and the threshold $C_2$ for comparing the difference values between the reference pixels and the pixels other than the adjacent pixels is set at "16."

Thus, a further effective filter effect can be implemented because the deblock filtering process having considered the characteristic that the average of luminance is different among the blocks can be performed.

Furthermore, according to this embodiment, the deblock filtering process judges whether or not to perform the filter operation as to the pixels in a direction sequentially going away from the boundary from the adjacent pixel adjacent to the reference pixel, and when it judges not to perform the filter operation as to a certain pixel, no filter operation is performed as to that pixel and the pixels thereafter.

It is thereby possible to reduce the number of times of judgment of whether or not to perform the filter operation as to the pixels so as to further accelerate the deblock filtering process.

Furthermore, according to this embodiment, the post filter portion 40 has the buffer capable of storing the pixel data equivalent to 21 pixels, and the deblock filtering process collectively reads all the pixel data from that one pixel to the reference pixels from the VRAM 35 to the buffer so as to perform the filter operation based on the pixel data of the buffer.

Thus, the deblock filtering process can be further accelerated because, as to each pixel of the pixel string, the pixel data necessary to perform the deblock filtering process is collectively read to the buffer for batch processing.

Furthermore, according to this embodiment, the deblock filtering process performs the filter operation to one of the horizontal pixel string or the vertical pixel string in the block, and then performs the filter operation to the other.

Thus, a further effective filter effect can be implemented because the deblock filtering process is performed to both the horizontal pixel string and the vertical pixel string in the block.

In the above embodiment, the motion picture data in the MPEG format is corresponding to compressed image data according to claims 1, 2 9 to 12, and the VRAM 35 is corresponding to an image storing means according to claim 3 or 5, and the buffer of the post filter portion 40 is corresponding to the storing means for work according to claim 3, 5 to 8. In addition, the reference pixels $r_{x0}$ and $r_{x1}$ are corresponding to the horizontal reference pixels according to claim 2, 4, 10 or 12, the reference pixels $r_{y0}$ to $r_{y7}$ are corresponding to the vertical reference pixels according to claim 2, 3, 6, 10 or 12, and the reference pixels $r_{x0}$ and $r_{x1}$ and the subject pixels $v_0$ to $v_7$ are corresponding to the first pixel string according to claim 3 or 4.

In addition, according to the above embodiment, the reference pixels $r_{y0}$ to $r_{y7}$ are corresponding to the second pixel string according to claim 3 or 5.

Moreover, while the above embodiment is constituted so that the horizontal filter operation as to the subject pixels $v_0$ to $v_7$ is performed when no mutual difference value of the pixels between that one pixel and the pixels of the same pixel string which are the reference pixels $r_{x0}$ and $r_{x1}$ positioned on the boundary in the adjacent block is exceeding thresholds $C_1$ and $C_2$, it is not limited thereto and it may also be constituted so that, as with the vertical filter operation, it determines whether or not to perform the horizontal filter operation as to the subject pixels $v_0$ to $v_7$ based solely on the value of that one pixel and the values of the reference pixels $r_{x0}$ and $r_{x1}$.

In addition, in the above embodiment, all the cases of performing the processes shown in the flowcharts in FIGS. 5 to 11 were described as to the cases of performing them by the hardware of the post filter portion 40. However, they are not limited thereto but these processes may also be performed by the CPU 30, in which case it may be constituted to execute the control program stored in the ROM 32 in advance or the program may be read to the RAM 34 from a storage medium storing the program showing procedures thereof.

Here, the storage media are semiconductor storage media such as the RAM and ROM, magnetic memory type storage media such as FD and HD, optical reading method media such as CD, CDV, LD and DVD or the like, and magnetic memory type/optical reading method media such as MO, including any storage medium readable by the computer irrespective of whether the reading method is electronic, magnetic or optical.

In addition, according to the above embodiment, while the image processing apparatus, image processing program and image processing method related to the present invention are applied to the cases of performing the deblock filtering process to the reproduced image when decoding the motion picture data compressed in the MPEG format and reproducing the motion picture by the multitasking OS in the computer 100 as shown in FIG. 1, they are not limited thereto but applicable to other cases as far as they do not deviate from the main point of the present invention. For instance, they are applicable to the cases of displaying the images based on the image data compressed in the JPEG format and the cases of expanding the image based on the compressed image data compressed by the image compressing process for performing the discrete cosine transform process and quantization process by a predetermined block.

As described above, the image processing apparatus according to claim 1 of the present invention has the effect of simplifying the filtering process for reducing the block noise when decoding the image compared to the past because it only needs to refer to the subject pixels and the reference pixels when judging whether or not to perform the filter operation and performing the filter operation. In addition, in the case where the expanded image is stored in storing means such as a memory, it can reduce the number of times of access to the storing means so that, as its effect, the acceleration of processing can be expected as to the image processing apparatus of which access to the storing means is a critical path.

Moreover, the image processing apparatus according to claims 2 to 8 of the present invention has the effect of simplifying the filtering process for reducing the block noise when decoding the image compared to the past because it only needs to refer to the subject pixels, horizontal reference pixels and vertical reference pixels when judging whether or not to perform the filter operation and performing the filter operation. In particular, it uses the pixels positioned on the boundaries in the horizontal reference block and vertical reference block as the horizontal reference pixels and vertical reference pixels, and so it has the effect of simplifying the filtering process without significantly reducing the filter effect. Furthermore, in the case where the expanded image is stored in the storing means such as the memory, it can reduce the number of times of access to the storing means so that, as its effect, the acceleration of processing can be expected as to the image processing apparatus of which access to the storing means is the critical path.

Furthermore, the image processing apparatus according to claims 3 to 8 of the present invention also has the effect of reducing the number of times of reading to the image storing means because, when performing the filter processing to the subject pixels of the first pixel string, it only has to read the pixels of the first and second pixel strings from the image storing means.

Moreover, the image processing apparatus according to claims 4 to 8 of the present invention also has the effect of reducing the number of times of reading to the image storing means because, when performing the filter processing to n subject pixels, it only has to read 2n+1 pixels from the image storing means. In addition, it has the effect of improving the filter effect because, when judging whether or not to perform the filter operation and performing the filter operation, the comparatively adequate reference pixels are used according to the area which the subject pixels belong to.

Furthermore, the image processing apparatus according to claims 5 to 8 of the present invention also has the effect of reducing the load and implementing a comparatively simple configuration in case of constituting it by the hardware because the updating of the pointer for the vertical reference pixel can be implemented just by the shifter and the adder.

Moreover, the image processing apparatus according to claims 6 to 8 of the present invention also has the effect of further reducing the number of times of reading to the image storing means because it is not necessary to reread the pixel data of the first horizontal reference pixel string and first subject pixel string from the image storing means.

Furthermore, the image processing apparatus according to claim 8 of the present invention can implement the efficient pipeline process at the time of judging whether or not to perform the filter operation and performing the filter operation so that, as its effect, the acceleration of processing can be expected. In addition, it reads the pixel data in order of the first vertical reference pixel string, second vertical reference pixel string, second subject pixel string and second horizontal reference pixel string so that the reading of the pixel data of the first vertical reference pixel string and second vertical reference pixel string and the reading of the pixel data of the second subject pixel string and second horizontal reference pixel string can be successively performed, and so it also has the effect of simplifying the reading process of the pixel data. Moreover, it also has the effect of comparatively reducing the circuit scale when constituting it by the hardware because it only requires work memory equivalent to 5n+1 pixels as against the work memory equivalent to at least one frame used for work in the past.

On the other hand, the image processing program according to claim 9 of the present invention has the effect equivalent to that of the image processing apparatus according to claim 1.

Furthermore, the image processing program according to claim 10 of the present invention has the effect equivalent to that of the image processing apparatus according to claim 2.

On the other hand, the image processing method according to claim 11 of the present invention has the effect equivalent to that of the image processing apparatus according to claim 1.

Furthermore, the image processing method according to claim 12 of the present invention has the effect equivalent to that of the image processing apparatus according to claim 2.

What is claimed is:

1. An image processing apparatus for, based on compressed image data compressed by an image compressing process for performing a discrete cosine transform process and a quantization process by a predetermined block, performing a filtering process to an expanded image on or after expanding the image by said block, wherein, in the case where a block horizontally adjacent to a subject block is a horizontal reference block, a block vertically adjacent to said subject block is a vertical reference block, and furthermore, one pixel in said subject block is a subject pixel, and one pixel in said horizontal reference block located on a boundary with said subject block and at the same vertical position as said subject pixel is a horizontal reference pixel, and one pixel in said vertical reference block located on the boundary with said subject block and at the same horizontal position as said subject pixel is a vertical reference pixel, said filtering process judges whether or not a difference value between a value of said subject pixel and a value of said vertical reference pixel is exceeding a threshold, said filtering process performs horizontal filter operation as to said subject pixel based solely on the value of said subject pixel and the value of said horizontal reference pixel, said filtering process determines whether or not to perform vertical filter operation as to said subject pixel based solely on said judgment result, and performs the vertical filter operation as to said subject pixel based solely on the value of said subject pixel and the value of said vertical reference pixel.

2. The image processing apparatus according to claim 1, usably connecting to image storing means for storing said expanded image; and having storing means for work for storing pixel data for performing said filtering process, and wherein, in the case where a plurality of pixels in said subject block and horizontally successive from the boundary with said horizontal reference block are said subject pixels, said filtering process collectively reads the pixel data of a first pixel string comprised of said plurality of subject pixels and said horizontal reference pixel and the pixel data of a second pixel string comprised of vertical reference pixels corresponding to said respective subject pixels into said storing means for work, makes said judgment as to each of said subject pixels based on the pixel data of said storing means for work, said filtering process performs horizontal filter operation as to said respective subject pixels based solely on the values of said subject pixels and the value of said horizontal reference pixel by referring to the pixel data of said storing means for work, said filtering process determines whether or not to perform vertical filter operation as to said respective subject pixels based solely on said judgment results corresponding to the subject pixels, and performs the vertical filter operation as to said respective subject pixels based solely on the values of said subject pixels and the values of said vertical reference pixels by referring to the pixel data of said storing means for work.

3. The image processing apparatus according to claim 2, constituting each of said blocks as a rectangular image area comprised of 2n (n≧1) pieces of pixel horizontally and 2m (m≧1) pieces of pixel vertically, and dividing it into four areas of upper left, upper right, lower left and lower right comprised of n pieces of pixel horizontally and m pieces of pixel vertically, and further constituting said first pixel string with horizontal reference pixel and the pixels belonging to the same area of said four areas;

said filtering process tries said filter operation as to all the pixels of said expanded image while repeating reading of said pixel data, said judgment and said filter operation as a series of processes;

as to the subject pixel belonging to the upper left area of said subject block, said filtering process uses the values of the reference pixels of the horizontal reference block and the vertical reference block adjacent to said subject block on the left of and above it for said judgment and said filter operation;

as to the subject pixel belonging to the upper right area of said subject block, said filtering process uses the values of the reference pixels of the horizontal reference block and the vertical reference block adjacent to said subject block on the right of and above it for said judgment and said filter operation;

as to the subject pixel belonging to the lower left area of said subject block, said filtering process uses the values of the reference pixels of the horizontal reference block and the vertical reference block adjacent to said subject block on the left of and below it for said judgment and said filter operation; and as to the subject pixel belonging to the lower right area of said subject block, said filtering process uses the values of the reference pixels of the horizontal reference block and the vertical reference block adjacent to said subject block on the right of and below it for said judgment and said filter operation.

4. The image processing apparatus according to claim 3, wherein said image storing means stores the pixel data of the pixels constituting said expanded image in order of left to right and top to bottom, said filtering process refers to a pointer for the vertical reference pixel pointing at a storage address of the pixel data of said second pixel string in said image storing means and reads the pixel data of said second pixel string into said storing means for work, and furthermore, in the case where the number of horizontal pixels of said expanded image is X and a vertical coordinate of the subject pixel in said subject block is y, as to each of the above described series of processes, said filtering process adds a value equivalent to the number of the subject pixels to be collectively processed in the process to the value of said pointer for the vertical reference pixel, when the subject block to be processed next is a leftmost block in said expanded image and a remainder on dividing y by 2m is "0", said filtering process subtracts 2X from the value of said pointer for the vertical reference pixel, when the subject block to be processed next is the leftmost block in said expanded image and the remainder on dividing y by 2m is m, said filtering process adds 2mX to the value of said pointer for the vertical reference pixel, when the subject block to be processed next is the leftmost block in said expanded image and the remainder on dividing y by 2m is a value other than "0" or m, said filtering process and subtracts X from the value of said pointer for the vertical reference pixel.

5. The image processing apparatus according to claim 4, wherein, in the case where the pixel string comprised of a left half of the pixels on the same horizontal line in said subject block is a first subject pixel string, the pixel string comprised of a right half thereof is a second subject pixel string, and furthermore, the pixel string in said horizontal reference block and adjacent to said first subject pixel string on the left of it and comprised of the same number of pixels as that of said second subject pixel string is a first horizontal reference pixel string, and the pixel string in said horizontal reference block and adjacent to said second subject pixel string on the right of it and comprised of the same number of pixels as that of said first subject pixel string is a second horizontal reference pixel string, and furthermore, the pixel string comprised of the vertical reference pixels corresponding to the subject pixels of said first subject pixel string is a first vertical reference pixel string, and the pixel string comprised of the vertical reference pixels corresponding to the subject pixels of said second subject pixel string is a second vertical reference pixel string, said filtering process reads the pixel data of said second subject pixel string, said second horizontal reference pixel string, said first vertical reference pixel string and said second vertical reference pixel string into said storing means for work as to each of said series of processes, also reuses the pixel data of said second subject pixel string and said second horizontal reference pixel string read in an immediately preceding process as the pixel data of said first horizontal reference pixel string and said first subject pixel string, and performs said judgment and said filter operation as to all the subject pixels of said first subject pixel string and said second subject pixel string.

6. The image processing apparatus according to claim 5, wherein said series of processes performed first for said expanded image reads the pixel data of said first subject pixel string, said second subject pixel string, said second horizontal reference pixel string, said first vertical reference pixel string and said second vertical reference pixel string into said storing means for work, and said series of processes performed for the second time and thereafter reads the pixel data of said second subject pixel string, said second horizontal reference pixel string, said first vertical reference pixel string and said second vertical reference pixel string into said storing means for work, and also reuses the pixel data of said second subject pixel string and said second horizontal reference pixel string read in an immediately preceding process as the pixel data of said first horizontal reference pixel string and said first subject pixel string.

7. The image processing apparatus according to claim 5, wherein, in the case where the process of copying the pixel data of said second subject pixel string and said second horizontal reference pixel string read in an immediately preceding process as the pixel data of said first horizontal reference pixel string and said first subject pixel string respectively is the first phase, the process of reading the pixel data of said first vertical reference pixel string into said storing means for work is the second phase, the process of reading the pixel data of said second vertical reference pixel string into said storing means for work is the third phase, the process of reading the pixel data of said second subject pixel string into said storing means for work is the fourth phase, the process of reading the pixel data of said second horizontal reference pixel string into said storing means for work is the fifth phase, the process of performing said horizontal filter operation as to each subject pixel of said first subject pixel string based on the pixel data of said first horizontal reference pixel string is the sixth phase, the process of performing said judgment and said vertical filter operation as to each subject pixel of said first subject pixel string based on processing results of said sixth phase and the pixel data of said first vertical reference pixel string is the seventh phase, the process of performing said horizontal filter operation as to each subject pixel of said second subject pixel string based on the pixel data of said second horizontal reference pixel string is the eighth phase, and the process of performing said judgment and said vertical filter operation as to each subject pixel of said second subject pixel string based on the processing results of said eighth phase and the pixel data of said second vertical reference pixel string is the ninth phase, said series of processes performs said first phase, said second phase, said third phase, said fourth phase and said fifth phase in that order, perform said sixth phase and said seventh phase in that order, perform said fifth phase, and said eighth phase and said ninth phase in that order, and also start performing said second phase and said sixth phase at the same time and performing said third phase and said seventh phase at the same time.

8. A computer readable medium encoded with an image processing program for, based on compressed image data compressed by an image compressing process for performing a discrete cosine transform process and a quantization process by a predetermined block, causing a computer to perform a filtering process to an expanded image on or after expanding the image by said block, wherein, in the case where a block horizontally adjacent to a subject block is a horizontal reference block, a block vertically adjacent to said subject block is a vertical reference block, and furthermore, one pixel in said subject block is a subject pixel, and one pixel in said horizontal reference block located on a boundary with said subject block and at the same vertical position as said subject pixel is a horizontal reference pixel, and one pixel in said vertical reference block located on the boundary with said subject block and at the same horizontal position as said subject pixel is a vertical reference pixel, said filtering process judges whether or not a difference value between a value of said subject pixel and a value of said vertical reference pixel is exceeding a threshold, said filtering process performs horizontal filter operation as to said subject pixel based solely on the value of said subject pixel and the value of said horizontal reference pixel, said filtering process determines whether or not to perform vertical filter operation as to said subject pixel based solely on said judgment result, and performs the vertical filter operation as to said subject pixel based solely on the value of said subject pixel and the value of said vertical reference pixel.

9. An image processing method for, based on compressed image data compressed by an image compressing process for performing a discrete cosine transform process and a quantization process by a predetermined block, performing a filtering process to an expanded image on or after expanding the image by said block, wherein, in the case where a block horizontally adjacent to a subject block is a horizontal reference block, a block vertically adjacent to said subject block is a vertical reference block, and furthermore, one pixel in said subject block is a subject pixel, and one pixel in said horizontal reference block located on a boundary with said subject block and at the same vertical position as said subject pixel is a horizontal reference pixel, and one pixel in said vertical reference block located on the boundary with said subject block and at the same horizontal position as said subject pixel is a vertical reference pixel, said filtering process judges whether or not a difference value between a value of said subject pixel and a value of said vertical reference pixel is exceeding a threshold, said filtering process performs horizontal filter operation as to said subject pixel based solely on the value of said subject pixel and the value of said horizontal reference pixel, said filtering process determines whether or not to perform vertical filter operation as to said subject pixel based solely on said judgment result, and performs the vertical filter operation as to said subject pixel based solely on the value of said subject pixel and the value of said vertical reference pixel.

10. The image processing apparatus according to claim 6, wherein, in the case where the process of copying the pixel data of said second subject pixel string and said second horizontal reference pixel string read in an immediately preceding process as the pixel data of said first horizontal reference pixel string and said first subject pixel string respectively is the first phase, the process of reading the pixel data of said first vertical reference pixel string into said storing means for work is the second phase, the process of reading the pixel data of said second vertical reference pixel string into said storing means for work is the third phase, the process of reading the pixel data of said second subject pixel string into said storing means for work is the fourth phase, the process of reading the pixel data of said second horizontal reference pixel string into said storing means for work is the fifth phase, the process of performing said horizontal filter operation as to each subject pixel of said first subject pixel string based on the pixel data of said first horizontal reference pixel string is the sixth phase, the process of performing said judgment and said vertical filter operation as to each subject pixel of said first subject pixel string based on processing results of said sixth phase and the pixel data of said first vertical reference pixel string is the seventh phase, the process of performing said horizontal filter operation as to each subject pixel of said second subject pixel string based on the pixel data of said second horizontal reference pixel string is the eighth phase, and the process of performing said judgment and said vertical filter operation as to each subject pixel of said second subject pixel string based on the processing results of said eighth phase and the pixel data of said second vertical reference pixel string is the ninth phase, said series of processes performs said first phase, said second phase, said third phase, said fourth phase and said fifth phase in that order, perform said sixth phase and said seventh phase in that order, perform said fifth phase, and said eighth phase and said ninth phase in that order, and also start performing said second phase and said sixth phase at the same time and performing said third phase and said seventh phase at the same time.

* * * * *